US009832102B2

(12) United States Patent
Farkas et al.

(10) Patent No.: US 9,832,102 B2
(45) Date of Patent: Nov. 28, 2017

(54) AUTOMATIC ESTABLISHMENT OF REDUNDANT PATHS WITH CAUTIOUS RESTORATION IN A PACKET NETWORK

(71) Applicant: Telefonaktiebolaget L M Ericsson (publ), Stockholm (SE)

(72) Inventors: János Farkas, Kecskemét (HU); David Ian Allan, San Jose, CA (US)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 304 days.

(21) Appl. No.: 14/453,430

(22) Filed: Aug. 6, 2014

(65) Prior Publication Data

US 2015/0043383 A1 Feb. 12, 2015

Related U.S. Application Data

(60) Provisional application No. 61/863,337, filed on Aug. 7, 2013.

(51) Int. Cl.
*H04L 12/721* (2013.01)
*H04L 12/46* (2006.01)
(Continued)

(52) U.S. Cl.
CPC ........ *H04L 45/123* (2013.01); *H04L 12/4641* (2013.01); *H04L 45/12* (2013.01); *H04L 45/22* (2013.01); *H04L 45/18* (2013.01)

(58) Field of Classification Search
CPC .... H04L 45/123; H04L 12/4641; H04L 45/22
See application file for complete search history.

(56) References Cited

U.S. PATENT DOCUMENTS 6,363,319 B1 * 3/2002 Hsu .................. H04L 45/00
370/238
6,985,959 B1 * 1/2006 Lee .................. H04L 45/00
709/238
(Continued)

FOREIGN PATENT DOCUMENTS

RU 2378770 C2 1/2010
RU 2402171 C1 10/2010

OTHER PUBLICATIONS

International Search Report and Written Opinion, Application No. PCT/IB2014/063754, dated Oct. 10, 2014, 12 pages.
(Continued)

*Primary Examiner* — Charles C Jiang
*Assistant Examiner* — Kyaw Z Soe
(74) *Attorney, Agent, or Firm* — Nicholson, De Vos, Webster & Elliot, LLP

(57) ABSTRACT

A method is implemented by a network device executing a local computation engine and a link state routing protocol. The local computation engine and the link state protocol support automatic establishment of redundant paths and cautious restoration in a packet network. The method includes receiving an explicit path (EP) type length value (TLV) via a link state routing protocol, executing a shortest path algorithm to obtain a shortest path for loose hops of a path identified by the EP TLV, the shortest path to be a primary path, updating a network graph to prune links of the primary path or bias links of the primary path, and calculating a backup path using the shortest path algorithm on the updated network graph.

28 Claims, 12 Drawing Sheets

(51) Int. Cl.
  *H04L 12/707* (2013.01)
  *H04L 12/705* (2013.01)

(56) References Cited

U.S. PATENT DOCUMENTS

| | | | |
|---|---|---|---|
| 7,266,085 B2 | 9/2007 | Stine | |
| 9,270,426 B1* | 2/2016 | Atlas | H04W 72/0466 |
| 2003/0161304 A1 | 8/2003 | DeBoer et al. | |
| 2004/0042406 A1* | 3/2004 | Wu | H04L 45/02 370/238 |
| 2006/0114916 A1* | 6/2006 | Vasseur | H04L 45/02 370/397 |
| 2006/0146696 A1* | 7/2006 | Li | H04L 41/06 370/218 |
| 2007/0280102 A1* | 12/2007 | Vasseur | H04J 3/14 370/225 |
| 2008/0049622 A1* | 2/2008 | Previdi | H04L 12/2602 370/237 |
| 2008/0279101 A1 | 11/2008 | Wu et al. | |
| 2011/0231573 A1 | 9/2011 | Vasseur et al. | |
| 2012/0230199 A1 | 9/2012 | Chiabaut | |
| 2013/0064244 A1 | 3/2013 | Sathappan et al. | |

OTHER PUBLICATIONS

Ali, Z. , et al., ""Node-ID Based Resource Reservation Protocol (RSVP) Hello: A Clarification Statement"", Network Working Group, Request for Comments: 4558, Category: Standards Track, Jun. 2006, 8 pages.

Andersson, L. , et al., "LDP Specification", Network Working Group, Request for Comments: 5036, Oct. 2007, 135 pages.

Awduche, et al., "RSVP-TE: Extensions to RSVP for LSP Tunnels", Network Working Group Request for Comments: 3209, Dec. 2001, 61 pages, The Internet Society.

Babiarz, J. , et al., "Configuration Guidelines for DiffServ Service Classes", Network Working Group, Request for Comments: 4594, The Internet Society, (Aug. 2006), 57 pages.

Baker, F. , et al., "A Differentiated Services Code Point (DSCP) for Capacity-Admitted Traffic", Internet Engineering Task Force (IETF); RFC 5865; May 2010; 14 pages.

Baker, F. , et al., "Management Information Base for the Differentiated Services Architecture", Network Working Group, Request for Comments: 3289, The Internet Society, (May 2002), 116 pages.

Berger, L. , "Generalized Multi-Protocol Label Switching (GMPLS) Signaling Resource ReserVation Protocol-Traffic Engineering (RSVP-TE) Extensions", Network Working Group, Request for Comments: 3473, http://tools.ietf.org/html/rfc3473, (Jan. 2003), 42 pages.

Bernet, Y. , et al., "An Informal Management Model for Diffserv Routers", Network Working Group, Request for Comments: 3290, The Internet Society, (May 2002), 56 pages.

Black, D. , "Differentiated Services and Tunnels," Oct. 2000, 14 pages, Network Working Group, Request for Comments: 2983, The Internet Society.

Black, D. , et al., "Per Hop Behavior Identification Codes," Jun. 2001, 8 pages, Network Working Group, Request for Comments: 3140, The Internet Society.

Blake, S. , et al., "An Architecture for Differentiated Services," Dec. 1998, 36 pages, Network Working Group, Request for Comments: 2475, The Internet Society.

Borman, D. , et al., "IPv6 Jumbograms," Aug. 1999, 9 pages, Network Working Group, Request for Comments: 2675, The Internet Society.

Braden, R. , et al., "Resource ReSerVation Protocol (RSVP) Version 1 Functional Specification", Network Working Group, Request for Comment: 2205, Sep. 1997, 112 pages.

Chan, K. , et al., "Differentiated Services Quality of Service Policy Information Base", Network Working Group, Request for Comments: 3317, The Internet Society, (Mar. 2003), 96 pages.

Charney, A. , et al., "Supplemental Information for the New Definition of the EF PHB (Expedited Forwarding Per-Hop Behavior)," Mar. 2002, 24 pages, Network Working Group, Request for Comments: 3247, The Internet Society.

Coltun, et al., "OSPF for IPv6", Network Working Group Request for Comments: 5340, IETF, https://tools.ietf.org/html/rfc5340, (Jul. 2008), 95 pages.

Davie, B. , et al., "An Expedited Forwarding PHB (Per-Hop Behavior)," Mar. 2002, 16 pages, Network Working Group, Request for Comments: 3246, The Internet Society.

Deering, S. , et al., Internet Protocol, Version 6 (IPv6) Specification, Dec. 1998, 39 pages, Network Working Group, Request for Comments: 2460, The Internet Society.

Eggert, L. , et al., "Unicast UDP Usage Guidelines for Application Designers," Nov. 2008, 27 pages, Network Working Group, Request for Comments: 5405, IETF Trust and the persons identified as the document authors.

Fenner, B. , et al., "Management Information Base for the User Datagram Protocol (UDP)," Jun. 2005, 19 pages, Network Working Group, Request for Comments: 4113, The Internet Society.

Grossman, D. , "New Terminology and Clarifications for Diffserv," Apr. 2002, 10 pages, Network Working Group, Request for Comments: 3260, The Internet Society.

Hedrick, C. , "Routing Information Protocol", Network Working Group; RFC 1058; Jun. 1988; 33 pages.

Heinanen, J. , et al., "Assured Forwarding PHB Group," Jun. 1999, 11 pages, Network Working Group, Request for Comments: 2597, The Internet Society.

Hopps, C. , "Analysis of an Equal-Cost Multi-Path Algorithm", Network Working Group, Request for Comments: 2992, The Internet Society, (Nov. 2000), 8 pages.

Housley, R. , "Using Advanced Encryption Standard (AES) CCM Mode with IPsec Encapsulating Security Payload (ESP)," Dec. 2005, 13 pages, Network Working Group, Request for Comments: 4309, The Internet Society.

Kent, S. , et al., "Security Architecture for the Internet Protocol," Dec. 2005, 101 pages, Network Working Group, Request for Comments: 4301, The Internet Society.

Kompella, et al., "Procedures for Modifying the Resource reSerVation Protocol (RSVP)", Network Working Group, Request for Comments: 3936, The Internet Society, (Oct. 2004), 8 pages.

Malkin, G. , et al., "RIP Version 2", Network Working Group; RFC 2453; Nov. 1998; 39 pages.

Malkin, et al., "RIPng for IPv6", Network Working Group, Request for Comments: 2080, (Jan. 1997), 20 pages.

Moy, J. , ""OSPF Version 2",", Network Working Group, Request for Comments: 2328, STD: 54, Apr. 1998, 244 pages.

Nichols, K. , et al., "Definition of the Differentiated Services Field (DS Field) in the IPv4 and IPv6 Headers," Dec. 1998, 20 pages, Network Working Group, Request for Comments: 2474, The Internet Society.

Nichols, K. , et al., "Definition of Differentiated Services Per Domain Behaviors and Rules for their Specification," Apr. 2001, 24 pages, Network Working Group, Request for Comments: 3086, The Internet Society.

Polk, et al., "A Resource Reservation Protocol (RSVP) Extension for the Reduction of Bandwidth of a Reservation Flow", Network Working Group, Request for Comments: 4495, The Internet Society, (May 2006), 22 pages.

Postel, J. , "User Datagram Protocol," Aug. 28, 1980, 3 pages, RFC: 768.

Rekhter, Y. , et al., "A Border Gateway Protocol 4 (BGP-4)", Network Working Group; RFC 4271; Jan. 2006; 104 pages.

Rosen, et al., "BGP/MPLS IP Virtual Private Networks (VPNs)", Network Working Group, Request for Comments: 4364, The Internet Society, (Feb. 2006), 47 pages.

Shenker, et al., "Specification of Guaranteed Quality of Service", Network Working Group, Request for Comments: 2212, (Sep. 1997), 20 pages.

Thaler, et al., "Multipath Issues in Unicast and Multicast Next-Hop Selection", Network Working Group, Request for Comments: 2991, The Internet Society, (Nov. 2000), 9 pages.

(56) References Cited

OTHER PUBLICATIONS

Wroclawski, J., "Specification of the Controlled-Load Network Element Service", Network Working Group, Request for Comments: 2211, (Sep. 1997), 20 pages.

Wroclawski, J., "The Use of RSVP with IETF Integrated Services", Network Working Group, Request for Comments: 2210, (Sep. 1997), 33 pages.

International Preliminary Report on Patentability, Application No. PCT/IB2014/063754, dated Feb. 18, 2016, 9 pages.

IEEE 802.1aq-2012: "Amendment 20: Shortest Path Bridging," IEEE Standard for Local and Metropolitan Area Networks, Media Access Control (MAC) Bridges and Virtual Bridged Local Area Networks, IEEE, Jun. 29, 2012, 340 pages.

IEEE 802.1Q-2012: "Media Access Control (MAC) Bridges and Virtual Bridged Local Area Networks," IEEE Standard for Local and Metropolitan Area Networks, 2012, 1782 pages.

IEEE 802.1Qca/D0.2: "Amendment: Path Control and Reservation," Draft Standard for Local and Metropolitan Area Networks, Media Access Control (MAC) Bridges and Virtual Bridged Local Area Networks, IEEE, Jul. 13, 2013, 32 pages.

IEEE 802.1 Qca/D0.3: "Amendment: Path Control and Reservation," Draft Standard for Local and Metropolitan Area Networks, Media Access Control (MAC) Bridges and Virtual Bridged Local Area Networks, IEEE, Aug. 9, 2013, 39 pages.

IEEE 802.1Qca/D0.8: "Amendment: Path Control and Reservation," Draft Standard for Local and Metropolitan Area Networks, Bridges and Bridged Networks, IEEE, Jun. 25, 2014, 112 pages.

IEEE 802.1Qcb/D0.3: "Seamless Redundancy," Draft Standard for Local and Metropolitan Area Networks, IEEE, May 19, 2014, 36 pages.

RFC 793: "Transmission Control Protocol, DARPA Internet Program Protocol Specification," Network Working Group, Request for Comments: 793, Sep. 1981, 91 pages.

RFC 1142: ORAN, "OSI IS-IS Intra-domain Routing Protocol," Network Working Group, Request for Comments: 1142, Feb. 1990, 157 pages.

RFC 1180: Socolofsky, et al., "A TCP/IP Tutorial," Network Working Group, Request for Comments: 1180, Jan. 1991, 28 pages.

Atlas, et al., "An Architecture for IP/LDP Fast-Reroute Using Maximally Redundant Trees, draft-ietf-rtgwg-mrt-frr-architecture-02," IETF, Routing Area Working Group, Internet-Draft, Feb. 24, 2013, 27 pages.

Enyedi, et al., "Algorithms for computing Maximally Redundant Trees for IP/LDP Fast-Reroute, draft-enyedi-rtgwg-mrt-frr-algorithm-03," IETF, Routing Area Working Group, Internet-Draft, Jul. 15, 2013, 51 pages.

Farkas, "P802.1Qca-D0.2 Editor's Notes," Ericsson, http://www.ieee802.org/1/files/public/docs2013/ca-farkas-editors-notes-0713-v01.pdf, Jul. 16, 2013, 15 pages.

Finn, et al, "Information flows for P802.1Qcc," downloaded from http://www.ieee802.org/1/files/public/docs2014/cc-nf-rc-Information-Flows-04-14-v1.pdf on May 18, 2016, 7 pages.

Communication under Rule 71(3) EPC (Intention to Grant), related EP Application No. 14753312.9, dated Jun. 22, 2016, 138 pages.

Search Report from foreign counterpart Russian Patent Application No. 2016107909/08 dated Jun. 19, 2017, 2 pages.

* cited by examiner

EXTERNAL PCE

PCE IN NETWORK NODES

METHOD FOR RESERVATION

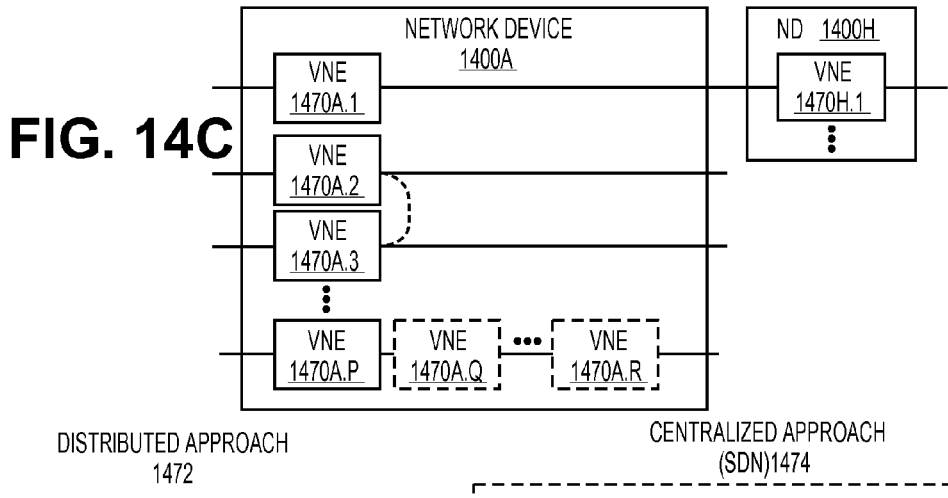
FIG. 14C
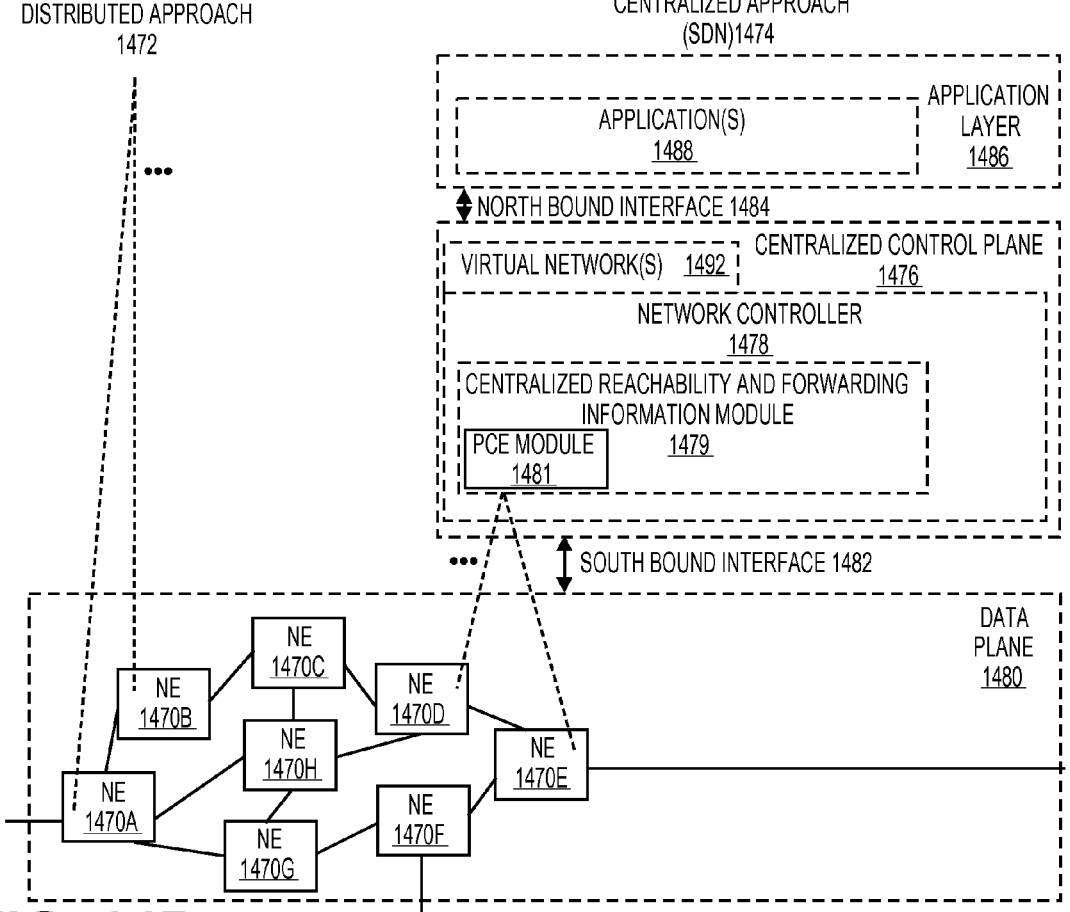
FIG. 14D
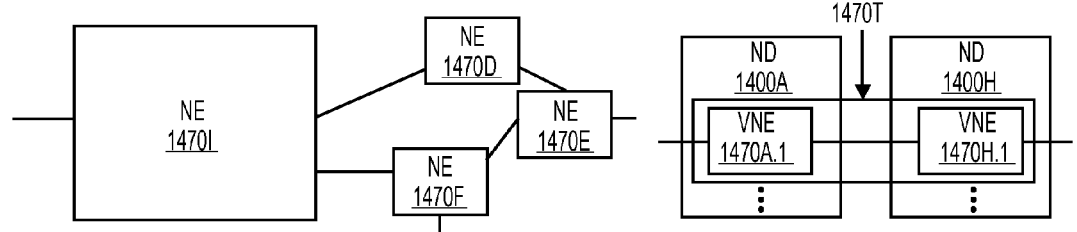
FIG. 14E
FIG. 14F

AUTOMATIC ESTABLISHMENT OF REDUNDANT PATHS WITH CAUTIOUS RESTORATION IN A PACKET NETWORK

CROSS REFERENCE TO RELATED APPLICATION

The present application claims priority from U.S. Provisional Patent Application No. 61/863,337, filed on Aug. 7, 2013.

FIELD OF THE INVENTION

The embodiments of the invention relate to a method and apparatus for providing path establishment and restoration in a packet network. Specifically, the embodiments of the invention relate to a method for path restoration in media access control (MAC) bridges and virtual bridged local area networks.

BACKGROUND

The forwarding paths within a network are typically controlled automatically by a path control protocol, which provide a single class of path, e.g. the shortest path, between selected end points. For example, a spanning tree protocol was traditionally used for path control in Ethernet networks. Link state control protocols such as the Intermediate System to Intermediate System (IS-IS) or the Open Shortest Path First (OSPF) routing protocols are used for path control in IP networks. Link state control is also available for Ethernet networks today, it is provided by Shortest Path Bridging (SPB), which is an extension to IS-IS. Nevertheless, all these protocols only provide a path based on default constraints, which is typically the shortest path or a spanning tree. Deviation from this "default path" and implementing explicit paths in the network is very difficult. The operation of the path control system can be influenced by cost parameters, however, the costs required for different explicit paths may contradict each other. Aside from the distributed protocols available today, only management controls are available for setting up an explicit path in Ethernet networks. The Stream Registration Protocol (SRP) or Multiple Stream Registration Protocol (MSRP) is able to perform reservation on top of a spanning tree in an Ethernet network, but this does not support complete route freedom as it acts within the constraints imposed by spanning tree protocol.

SUMMARY

A method is implemented by a network device executing a local computation engine and a link state routing protocol. The local computation engine and the link state protocol support automatic establishment of redundant paths and cautious restoration in a packet network. The method includes receiving an explicit path (EP) type length value (TLV) via a link state routing protocol, executing a shortest path algorithm to obtain a shortest path for loose hops of a path identified by the EP TLV, the shortest path to be a primary path, and installing forwarding database entries for the primary path. The method further includes updating a network graph representing a view of the topology of the network to prune links of the primary path or bias links of the primary path, calculating a backup path using the shortest path algorithm on the updated network graph, and installing forwarding database entries for the backup path.

A network device executes a path computation element and a link state routing protocol, where the path computation element and the link state protocol support automatic establishment of redundant paths and cautious restoration in a packet network. The computing device includes a non-transitory machine-readable storage medium to receive and store a set of explicit path (EP) type length value (TLV) received via a link state routing protocol, and a processor coupled to the memory device. The processor is configured to execute a local computation engine (LCE) module to process the EP TLV, to execute a shortest path algorithm to obtain a shortest path for loose hops of a path identified by the EP TLV, the shortest path to be a primary path, and to install forwarding database entries for the primary path. The processor is further configured to update a network graph to prune links of the primary path or bias links of the primary path, to calculate a backup path using the shortest path algorithm on the network graph, and to install forwarding database entries for the backup path.

A control plane device executes a path computation element and a link state routing protocol, where the path computation element and the link state protocol support automatic establishment of redundant paths and cautious restoration in a packet network. The control plane device includes a non-transitory machine-readable storage medium to receive and store a set of explicit path (EP) type length value (TLV) received via a link state routing protocol and a network processor coupled to the memory device. The network processor is configured to execute a path computation element (PCE) module to generate the EP TLV to be sent to LCE modules in the packet network to direct the LCE modules to execute a shortest path algorithm to obtain a shortest path for loose hops of a path identified by the EP TLV, the shortest path to be a primary path, and to install forwarding database entries for the primary path. The LCE module further responds to the EP TLV to update a network graph to prune links of the primary path or bias links of the primary path, to calculate a backup path using the shortest path algorithm on the updated network graph, and to install forwarding database entries for the backup path.

A computing device implement a plurality of virtual machines for implementing network function virtualization (NFV). At least one virtual machine from the plurality of virtual machines is configured to execute a path computation element and a link state routing protocol. The path computation element and the link state protocol support automatic establishment of redundant paths and cautious restoration in a packet network. The computing device includes a non-transitory machine-readable storage medium to receive and store a set of explicit path (EP) type length value (TLV) received via a link state routing protocol, and a processor coupled to the memory device. The processor is configured to execute the virtual machine that implements the local computation engine (LCE) module that processes the EP TLV, executes a shortest path algorithm to obtain a shortest path for loose hops of a path identified by the EP TLV, the shortest path to be a primary path, and installs forwarding database entries for the primary path. The LCE module is further configured to update a network graph to prune links of the primary path or bias links of the primary path, to calculate a backup path using the shortest path algorithm on the updated network graph, and to install forwarding database entries for the backup path.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIG. 14C illustrates various exemplary ways in which virtual network elements (VNEs) may be coupled according to some embodiments of the invention.

FIG. 14D illustrates a network with a single network element (NE) on each of the NDs of FIG. 14A, and within this straight forward approach contrasts a traditional distributed approach (commonly used by traditional routers) with a centralized approach for maintaining reachability and forwarding information (also called network control), according to some embodiments of the invention.

FIG. 14E illustrates the simple case of where each of the NDs 1400A-H implements a single NE 570A-H (see FIG. 14D), but the centralized control plane 1476 has abstracted multiple of the NEs in different NDs (the NEs 1470A-C and G-H) into (to represent) a single NE 1470I in one of the virtual network(s) 1492 of FIG. 14D, according to some embodiments of the invention.

FIG. 14F illustrates a case where multiple VNEs (VNE 1470A.1 and VNE 1470H.1) are implemented on different NDs (ND 1400A and ND 1400H) and are coupled to each other, and where the centralized control plane 1476 has abstracted these multiple VNEs such that they appear as a single VNE 1470T within one of the virtual networks 1492 of FIG. 14D, according to some embodiments of the invention.

DETAILED DESCRIPTION

Figure 1:
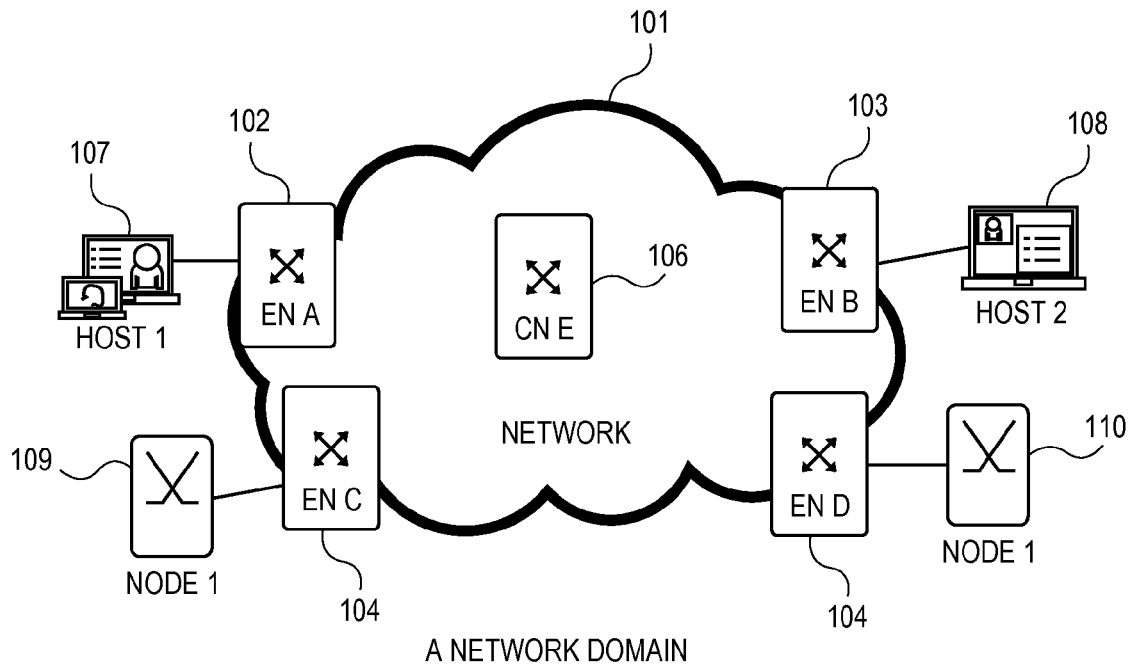
FIG. 1 is a diagram of an example packet network.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The operations of the flow diagrams will be described with reference to the exemplary embodiment of the figures. However, it should be understood that the operations of the flow diagrams can be performed by embodiments of the invention other than those discussed with reference to the figures, and the embodiments discussed with reference to the figures can perform operations different than those discussed with reference to the flow diagrams of the figures. Some of the figures provide example topologies and scenarios that illustrate the implementation of the principles and structures of the other figures.

The techniques shown in the figures can be implemented using code and data stored and executed on one or more electronic devices (e.g., an end station, a network element, etc.). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data, voice, and video). Subscriber end stations (e.g., servers, workstations, laptops, palm tops, mobile phones, smart phones, multimedia phones, Voice Over Internet Protocol (VOIP) phones, portable media players, GPS units, gaming systems, set-top boxes (STBs), etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public web pages (free content, store fronts, search services, etc.), private web pages (e.g., username/password accessed web pages providing email services, etc.), corporate networks over VPNs, IPTV, etc. Typically, subscriber end stations are coupled (e.g., through customer premise equipment coupled to an access network (wired or wirelessly) to edge network elements, which are coupled (e.g., through one or more core network elements to other edge network elements) to other end stations (e.g., server end stations).

Overview of Architecture and Path Control and Reservation

There is no protocol that provides explicit path control in Ethernet networks. Configuring each node along the path by means of management controls is not viable, especially in a large network. The application of RSVP-TE in Ethernet is not viable either, it has a huge implementation burden, and Layer 3 solutions are not applicable in Ethernet networks due to being bound to IP. Furthermore, in certain networking scenarios, running a signaling protocol, e.g. MSRP or RSVP-TE is not wanted. Furthermore, MSRP is not applicable for explicit path control, it is not the intended function of MSRP, which is to run on top of already established paths. Having a single protocol controlling both the default and the explicit paths would be attractive in Internet Protocol (IP) networks too. A solution integrated into a single protocol also does not exist for IP/MPLS networks.

The embodiments of the invention build upon an architecture and protocol where Explicit Path (EP) Type Length Values (TLVs) have been defined such that they can describe a path in any network controlled by IS-IS including Ethernet networks. Furthermore, the EP TLVs are defined such that they can be carried in other protocol data units (PDUs) other than IS-IS PDUs, e.g. in MSRPDUs. The EP TLVs can also be referred to as Topology sub-TLVs. Topology sub-TLVs encompass at least the functionality of EP TLVs as described herein. Topology sub-TLVs can convey explicit trees and/or explicit paths. As used herein, 'paths' and 'trees' may be utilized interchangeably with paths being variants of trees and explicit paths being variants of explicit trees. For sake of clarity the embodiments are discussed primarily in term of EP TLVs being used to defined explicit paths, however, those skilled in the art would understand that the concepts, processes and structures discussed are equivalent and encompass Topology sub-TLVs that describe explicit paths or explicit trees.

Additionally, the architecture and protocol introduce a database referred to as the Explicit Path Database (EPDB) for the storage of the EP TLVs. Not all network nodes may store a given EP TLV, except the network nodes along the path determined by the EP TLV. The method for path control and reservation is specified in this protocol using a modular structure that allows flexibility for combining different solutions, e.g. the path control method with the reservation provided by MSRP in case of Ethernet.

This architecture and protocol defines a method and apparatus for the control of forwarding paths in packet networks and performing reservations on top of the packet forwarding paths. FIG. 1 is a diagram of one example packet network 101. The network nodes comprising the packet network 101 fall into two categories: they are either Edge Nodes (EN) such as nodes 102, 103, 104, and 105 or they are Core Nodes (CN) as node 106. The packet network 101 typically connects hosts to each other, e.g. Host 1 107 and Host 2 108. The packet network 101 is often used to connect further network devices e.g. further network nodes, e.g. Node 1 109 and Node 2 110. A network domain within the packet network is often controlled by an Interior Gateway Protocol (IGP) such as the Intermediate System to Intermediate System (IS-IS) or the Open Shortest Path First (OSPF) link state routing protocols. A packet network typically either applies Layer 2 or Layer 3 mechanisms as the main principle for packet forwarding. That is forwarding may be based on Layer 2 addresses, i.e. MAC addresses or based on IP addresses in case of Layer 3 forwarding. Note that packets are often referred to as frames in case of Layer 2.

The basic path control mechanism applied in packet networks is shortest path routing. Routing systems based on either the IS-IS and OSPF routing protocols implement the Dijkstra algorithm for path computation, which is often referred to as the Shortest Path First (SPF) algorithm because it selects the shortest path from the possible paths between the source and the destination of the packet. The core of link state routing is that each network node maintains an identical replica of the Link State Database (LSDB), which is comprised of the link state information the nodes flood to each other. The LSDB for example provides the graph representing the network topology, which is the input for the Dijkstra algorithm.

Constrained Routing (CR) was introduced in order to be able to deviate somewhat from the shortest path. CR enables different parameters to be introduced to be associated with network links, e.g. color, available bandwidth, link delay, or Shared Risk Link Group (SRLG), these parameters are flooded across the packet network together with the other link state data during the link state operation. Network nodes thus are able to maintain a database comprising these further characteristics of network components, this database is referred to as Traffic Engineering Database (TED). In the case of CBR, the SPF algorithm is run on a pruned graph that is derived from LSDB, but only comprised of links meeting a constraint, which is checked using the information in the TED. Thus, a Constrained Shortest Path First (CSPF) algorithm can be applied to packet networks, which produces a Constrained Shortest (CS) path.

However, there are certain traffic types, network conditions and/or operator preferences for which neither the shortest paths nor CS paths are satisfactory. In order to be able to satisfy these traffic types, network conditions and/or operator preferences, the network has to be able to provide explicit paths as well.

Figure 2:
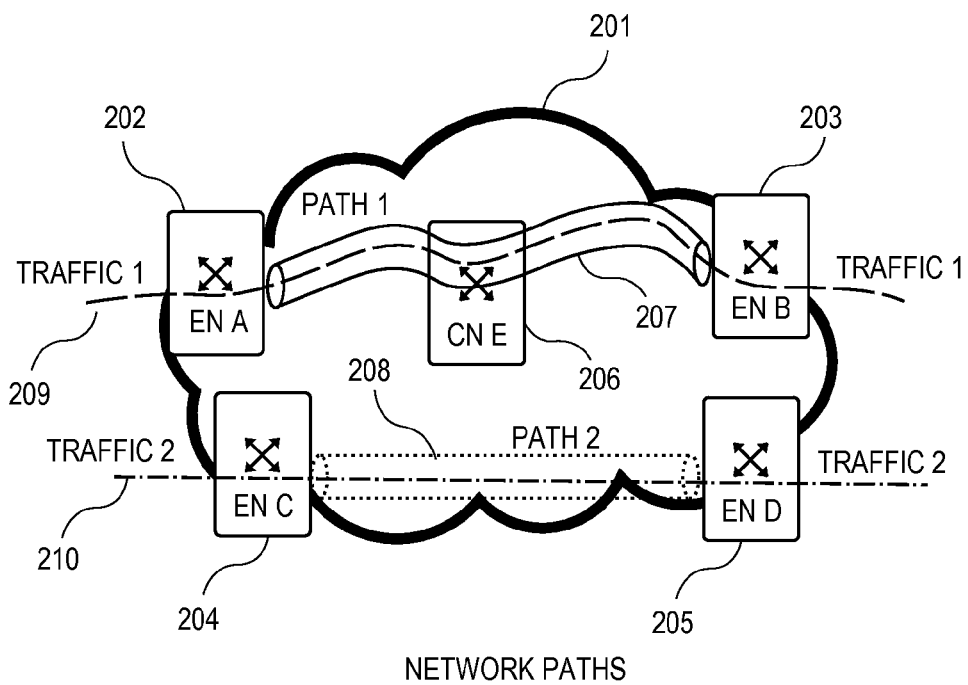
FIG. 2 is a diagram of the packet network illustrating explicit routing compared to shortest path routing in the packet network

FIG. 2 is a diagram of the packet network illustrating explicit routing compared to shortest path routing in the packet network 201. Path 2 208 provides the shortest path between EN C 204 and EN D 205. As the shortest path is just fine for Traffic 2 210, it is mapped to Path 2 208. Traffic 1

209 traverses the packet network 201 between EN A 202 and EN B 203. However, for any of the above-mentioned reasons, Traffic 1 209 should follow a path completely different from the shortest path. In fact, it is required that Traffic 1 209 be sent through CN E 206, which is not on the shortest path between EN A 202 and EN B 203. Therefore, the network needs to be able to install and provide Path 1 207 for the packets of Traffic 1 209.

Figure 3:
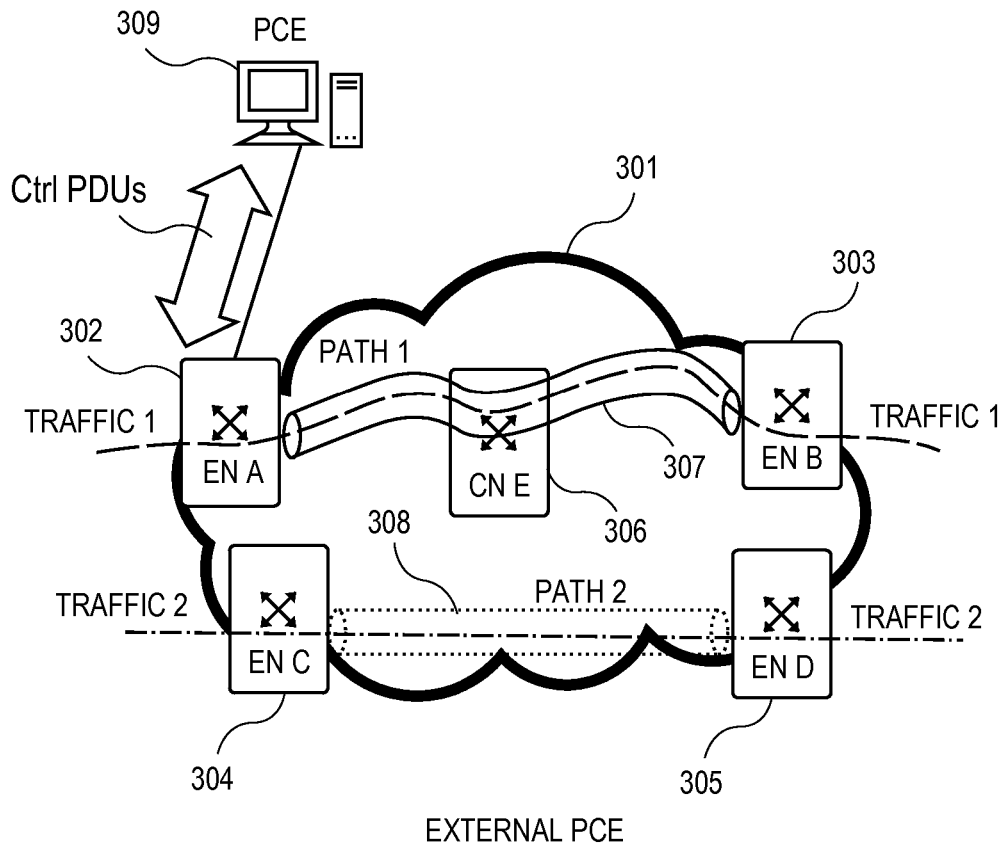
FIG. 3 is a diagram of one embodiment of packet network including an external Path Computation Element.

FIG. 3 is a diagram of one embodiment of packet network including an external Path Computation Element. The architecture and protocol utilizes a Path Computation Element (PCE) application 309, which may be run on a device, e.g. computer that is external to the network domain 301. The external device running the PCE application 309 is connected to one of the ENs of the network, e.g. EN A 302 in the example shown in FIG. 3. Furthermore, the PCE application 309 receives the Control PDUs used by the protocols applied for routing and reservation. Therefore, the PCE 309 is able to maintain exactly the same databases (i.e., the LSDB and TED) maintained in the network nodes e.g. 303-306 by the control protocols applied in the network. In addition, the PCE 309 can instruct the network nodes to perform certain actions, especially the EN it is connected to 302 e.g. by means of Control PDUs initiated by the PCE 309.

Furthermore, the PCE 309 may influence the operation of network control protocols, e.g. by means of Control PDUs. Thus it is the PCE 309 that determines for example Path 1 307 required for Traffic 1. The PCE 309 then instructs EN A 302 to perform the appropriate actions in order to have the explicit path, i.e. Path 1 307 installed in the network. For example EN A 302 can send control PDUs to the other network nodes instructing them on installing the explicit path. Note that there can be a single central external PCE 309 applied for a network domain 301 or there may be multiple PCE applications running, e.g. on distinct devices external to the network.

Figure 4:
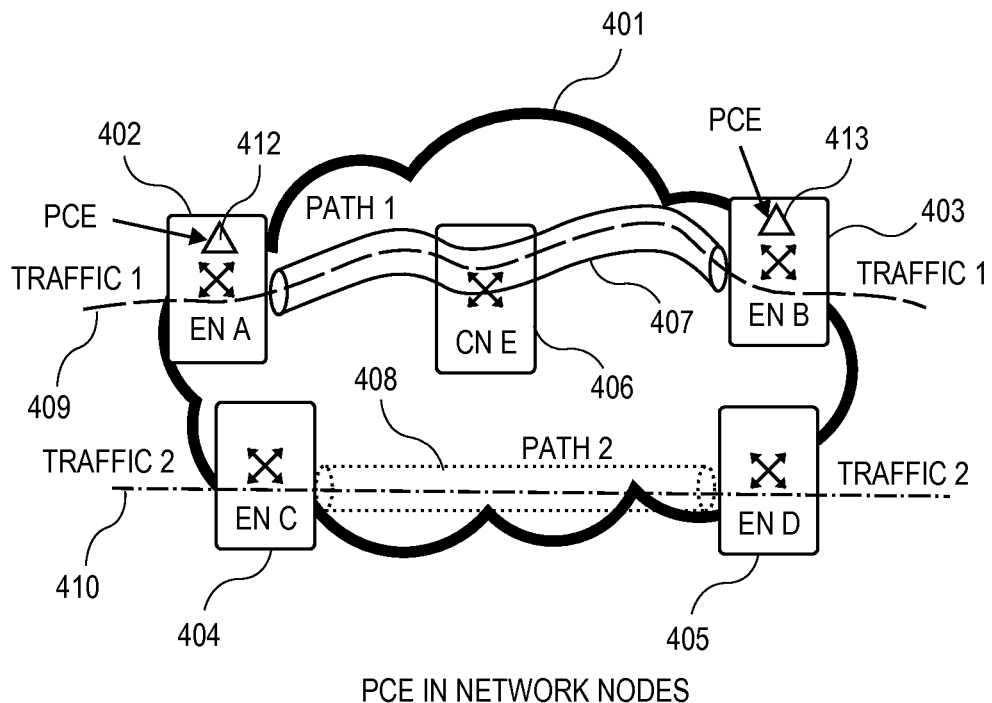
FIG. 4 is a diagram of one embodiment of packet network with multiple Path Computation Elements implemented by network nodes.

Alternatively, the architecture and protocols utilized by the embodiments can be implemented such that network nodes, e.g. edge nodes or even each node in the network, run a PCE application. FIG. 4 is a diagram of one embodiment of packet network with Path Computation Elements hosted by network nodes. FIG. 4 illustrates the case when the PCE application is run by network nodes instead of external entities. In the example shown in FIG. 4, EN A 402 and EN B 403 each run a PCE application, this is in addition to performing regular network operation actions, such that both nodes are able to perform the same actions as the external device of FIG. 3. The PCE application is illustrated by a small triangle in the network nodes. That is, the PCE application 412 is run by EN A 402 and the PCE application 413 is the PCE application run by EN B 403. The PCE application run on the network nodes has access to the databases of the control protocols and can perform such actions that the network node sends out the control PDUs required by the PCE. Thus, the PCE application is able to perform the computation of the explicit or constrained routes.

Furthermore, each PCE application is able to perform the actions required to configure other network nodes to install an explicit path, e.g. by means of sending out appropriate control PDUs to other nodes. Network nodes not hosting a PCE application cannot perform explicit path control actions aside from installing the path they are instructed to install, hence, they do not see any difference between external and network node hosted PCE applications.

In some embodiments, a bridge local computation engine (BLCE) or more generally a local computation engine (LCE) can be implemented that performs path and routing computation at a node (e.g., a bridge in the case of the BLCE). The LCE can implement SPF CSPF, and/or a disjoint path or maximally redundant tree algorithm. PCE and LCE can be architecturally different entities. A LCE is implemented in each node (e.g., each bridge implementing a BLCE), where the LCE implements the SPF algorithm (i.e. Dijkstra's algorithm) at the minimum and can also implement more complex path computation algorithms, e.g. for determining constrained or redundant trees. The LCE can implement an all pairs shortest path algorithm in addition to SPF. Forwarding trees can be computed by the LCEs unless they are explicitly given. Conversely, a PCE can implement more complex computation algorithms and its main task is to determine explicit trees; even if the PCE resides in a bridge. The embodiments described further herein generally discuss the implementation of functions by PCEs, however, those skilled in the art would understand that the division of the implementation of the described functionality could encompass some functions or steps being implemented by LCEs at each respective node and that the description of the methods and processes herein as implemented by PCEs encompass embodiments where LCEs may implement some of the described steps or functions of these processes and methods.

Figure 6:
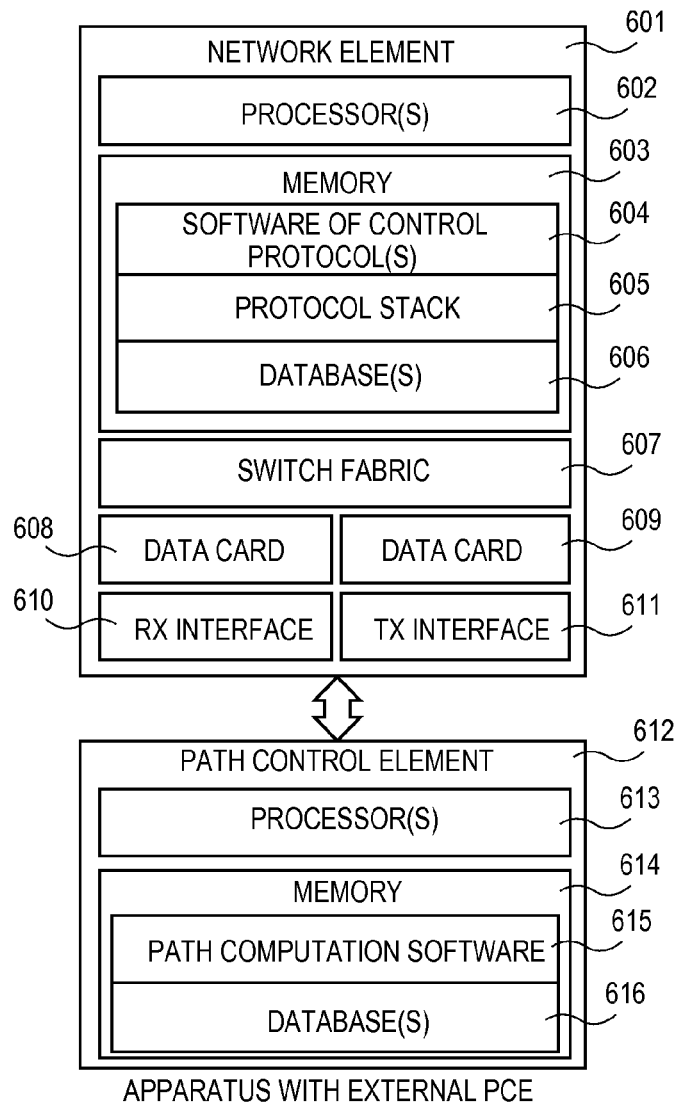
FIG. 6 is a diagram of one embodiment of a network element communicating with an external PCE.
Figure 7:
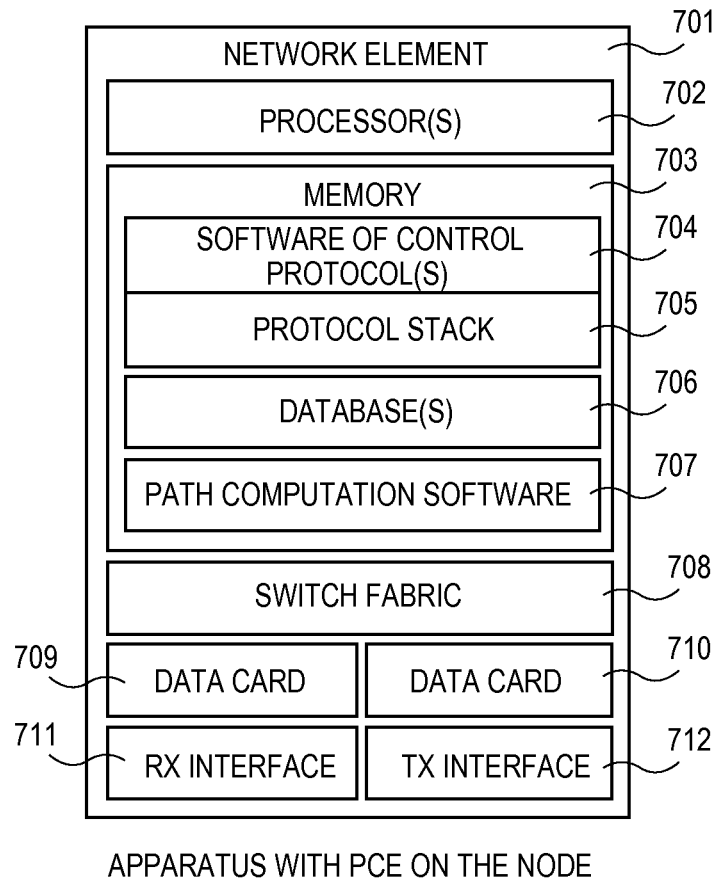
FIG. 7 is a diagram of one embodiment of a network element including a PCE.

Having the above-mentioned options for the location of the PCE application, there are also two options for the apparatus implementing the proposed method. The apparatus for external PCE is shown in FIG. 6. The apparatus in case of network nodes implementing the PCE application is shown in FIG. 7.

FIG. 6 is a diagram of one embodiment of a network element communicating with an external PCE. As FIG. 6 shows, there is communication between the network element 601 and the Path Control Element 612 if PCE is hosted by an external device. The network element 601 example illustrated in FIG. 6 includes a data plane including a switching fabric 607, a number of data cards, e.g. 608 and 609, at least a receiver (Rx) interface 610 and at least a transmitter Tx interface 611. The Rx and Tx interfaces 610 and 611 interface with links on the network, the data cards 608 and 609 perform functions on data received over the interfaces 610 and 611, and the switching fabric 607 switches data between the data cards and similar input/output (I/O) cards.

The network element 601 also includes a control plane, which includes one or more processors 602 containing control logic configured to implement e.g. a link state routing process for controlling shortest path based forwarding. Other processes may be implemented in the control logic as well.

The network element 601 also includes a memory 603, which stores software for control protocols 604, a protocol stack 605, and one or more databases 606. The software for control protocols 604 may contain data and instructions associated with the link state routing process, for example an LCE that implements SPF (i.e. Dijkstra's algorithm). The protocol stack 605 stores network protocols implemented by the network element 601. The databases are used for determining and storing the forwarding paths. The network element 601 may contain other software, processes, and stores of information to enable it to perform the functions for the Path Control and Reservation (PCR) method including the path restoration process described herein below and to perform other functions commonly implemented in a network element on a communication network.

The PCE 612 coupled to a network element 601 includes one or more processors 613 coupled to a memory 614. The processors 613 include logic to perform path computation operations and operations for the instruction of the network element 601. The memory 614 includes path computation software 615 applicable for determining explicit paths and reservation data as well as the path restoration process described herein below. The memory 614 also includes databases 616. The databases may include a replica of the databases stored by the network element 601 and may include further databases, e.g. for path computation.

FIG. 7 is a diagram of one embodiment of a network element including a PCE. As FIG. 7 illustrates, the network element 701 may host PCE application software as well. Thus the network element 701 example illustrated in FIG. 7 includes a data plane including a switching fabric 708, a number of data cards, e.g. 709 and 710, at least a receiver (Rx) interface 711 and at least a transmitter (Tx) interface 712. The Rx and Tx interfaces 711 and 712 interface with links on the network, the data cards 709 and 710 perform functions on data received over the interfaces 711 and 712, and the switching fabric 708 switches data between the data cards and/or other I/O cards. The network element 701 also includes a control plane, which includes one or more processors 702 containing control logic configured to implement e.g. a link state routing process for controlling shortest path based forwarding.

Furthermore, the processors 702 also implement the logic for path computation and reservation including the path restoration described herein below. Other processes may be implemented in the control logic as well. The network element 701 also includes a memory 703, which stores software for control protocols 704, a protocol stack 705, one or more databases 706 and the path computation software 707. The software for control protocols 704 may contain data and instructions associated with the link state routing process, for example an LCE that implements SPF (i.e. Dijkstra's algorithm). The protocol stack 705 stores network protocols implemented by the network element 701.

The databases are used for determining and storing the forwarding paths. The databases are further used by the path computation logic and may involve components required for path computation and reservation. The memory 703 includes path computation software 707 applicable for determining explicit paths and reservation data. The network element 701 may contain other software, processes, and stores of information to enable it to perform the functions for the proposed path control and reservation method and to perform other functions commonly implemented in a network element on a communication network.

Figure 9:
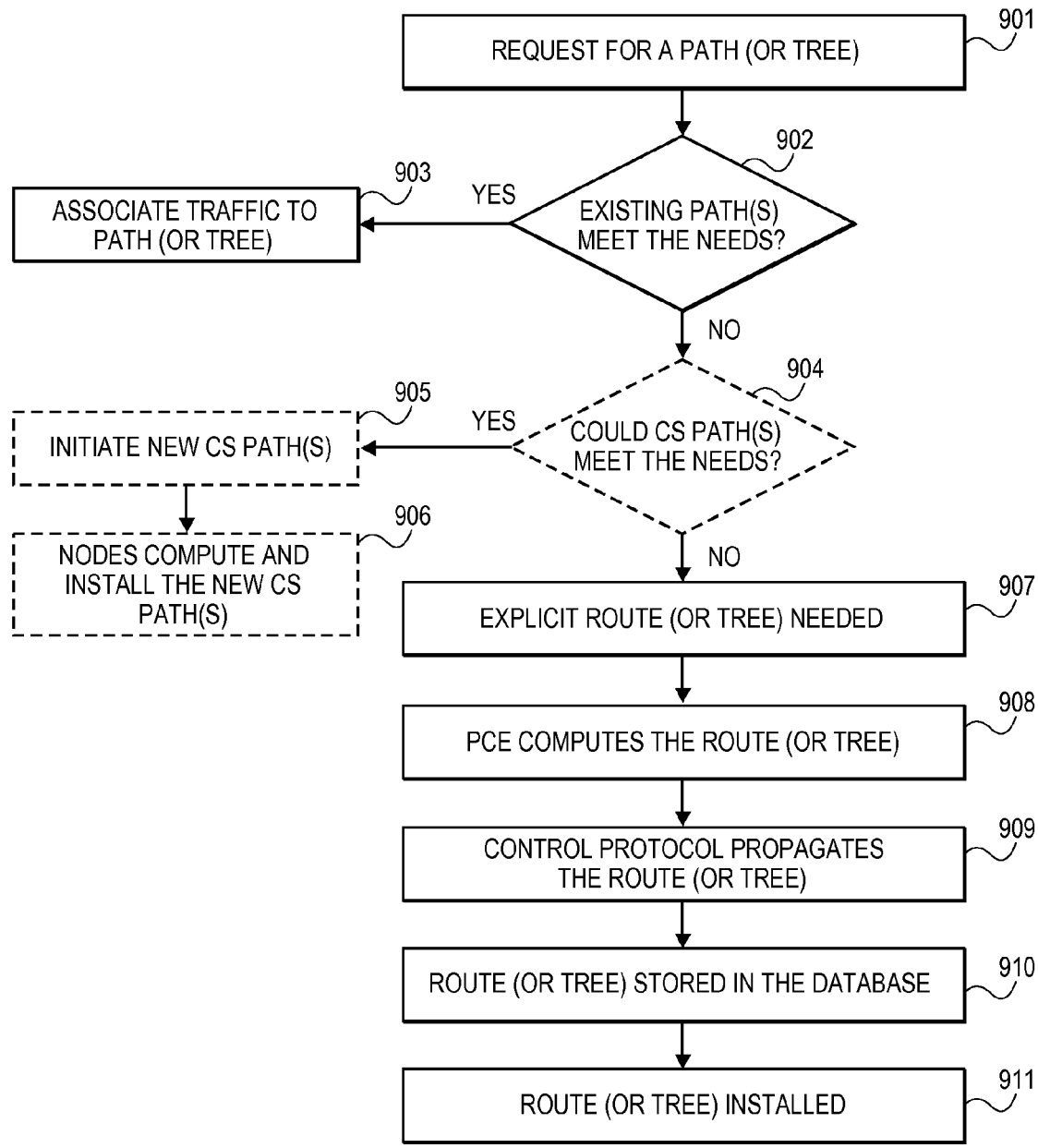
FIG. 9 is a flowchart of one embodiment of the path control method.

FIG. 9 is a flowchart of one embodiment of the path control method. There might be various entities that may request a network path for packet forwarding, for example it can be a host (e.g. 107) attached to a network node, another protocol entity e.g. SRP, or can be the administrator for the network for the establishment of a new service etc. Furthermore, there might be a need for a tree instead of a path, e.g. for the distribution of a multicast traffic. Therefore, the first step is the request for a path or a tree as shown by step 901 in FIG. 9. It is then examined in step 902 whether an existing path or tree meets the needs of the traffic that is aimed to be carried on the path. If yes, then nothing else is to be done but associating the traffic to the appropriate existing path or tree as shown by step 903. If there is not such a path, then one or more Constrained Shortest (CS) paths may be satisfactory. Thus the next step is 904, where it is examined whether new CS paths could make it possible to meet the needs, e.g. traffic requirements. If yes, then the establishment of one or more new CS paths is initiated in step 905 by taking into account the appropriate constraint. As CR is distributed, the network nodes (e.g., via an LCE) then compute and install the CS paths on their own in step 906. Note that steps 904, 905, and 906 can only be performed if the network implements CR that is why these steps are illustrated by dashed frames. If CR is not implemented, then step 907 comes directly after 902.

If CR is implemented but the PCE came to the conclusion (step 907) that CS paths would not provide the paths with the characteristics needed, then an explicit path or explicitly determined tree is needed. In step 908, the PCE then computes the path or tree. If there is no such path in the network that could meet the requirements, then no further steps are made but the PCE reports an error to network management. If the PCE could determine an appropriate path or tree, then the PCE instructs a distributed control protocol applied in the network to propagate the path or tree thorough the network as shown in step 909. The instruction may take different forms depending on the architecture applied. If the PCE resides on a network node as shown in FIG. 4 and FIG. 7, then the PCE application just needs to instruct the local instance of the control protocol application. If the PCE is hosted by an external device as shown in FIG. 3 and FIG. 6, then the PCE needs to instruct the network node it is connected to in order to perform the appropriate actions by its control protocol application.

The control protocol used for the distribution of the explicit paths may for example be the link state routing protocol applied for controlling the shortest paths, e.g. IS-IS. In step 910, network nodes then store the path or tree in their local database. Furthermore, the network nodes also install the path or tree in their dataplane thus providing the flow of packets taking the path as shown by step 911.

Figure 10:
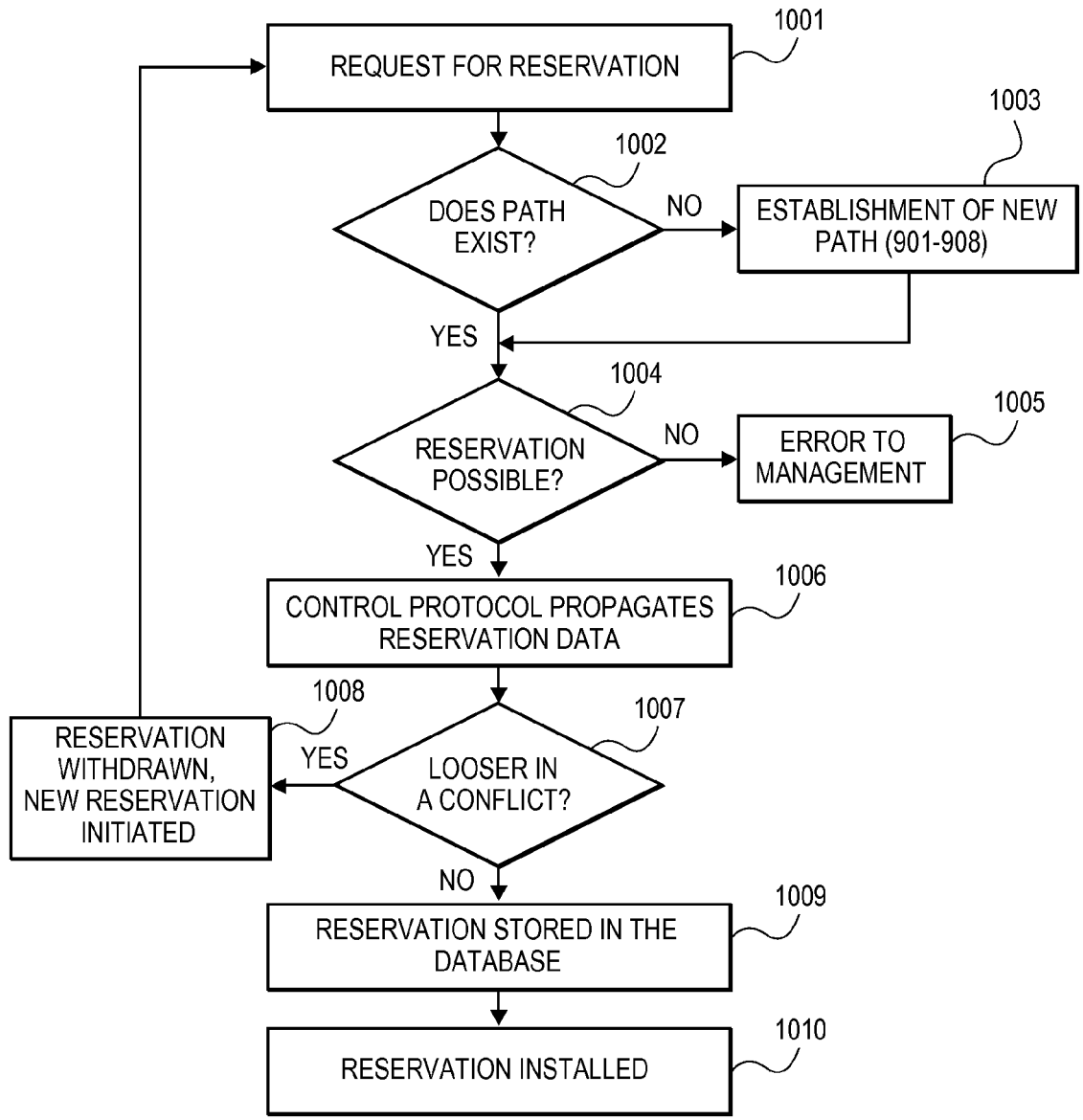
FIG. 10 is a flowchart of the reservation method of the protocol.

The protocol may also involve a reservation component aside from the path control presented above as there are traffic types requiring the reservation of resources along their path in order to meet their requirements. Reservation may be performed along an existing path, e.g. along a shortest path, or it may happen that a new path is required too aside reservation. FIG. 10 is a flowchart of the reservation method of the protocol. After having the reservation request in step 1001, the PCE evaluates in step 1002 whether the path for reservation exist. For example, the reservation request may contain an identifier of the path or reservation just has to be done along the shortest path, which is maintained anyways by the control protocols. If the path does not exist, then steps 901-908 of the path control method depicted in FIG. 9 are invoked. Note that if there is no such path in the network that could meet the requirements, then no further steps are made after 908 but the PCE reports an error to network management. If the path was already there in the network, then it has to be examined in step 1004 whether the reservation of required resources is possible along the path. If it is not possible, then an error message is sent to network management in step 1005 and no further steps are taken. Step 1006 is reached if the path is in place in the network and reservation is possible too. Thus the control protocol applied for invoking the reservation then propagates reservation data in the network, which may for example be the bandwidth required by the given traffic.

The control protocol applied for the distribution of this data may be the routing protocol of the network, e.g. IS-IS or it may be a protocol designed for reservation, e.g. the Multiple Stream Reservation Protocol (MSRP). It might happen that multiple reservation actions have been initiated in the network for the same resources, which is a race condition for the given resources and causes a reservation conflict. The reservation conflict has to be resolved by an unambiguous tie-breaking, e.g. the reservation will take place for the device having the smallest address (e.g. MAC address) among the devices initiating the reservation. If there is a conflict, then actions have to be taken for the loser as shown by step 1007. That is the loser is informed on failing in making the reservation thus it is able to restart the reservation process, furthermore, the resources reserved during the failed reservation have to be released as shown by step 1008. As step 1009 shows, if the reservation process goes fine, then each network node stores reservation data in their database. Of course the reservation is also installed as shown by 1010, i.e. network resources are reserved for the given traffic along the path.

Figure 5:
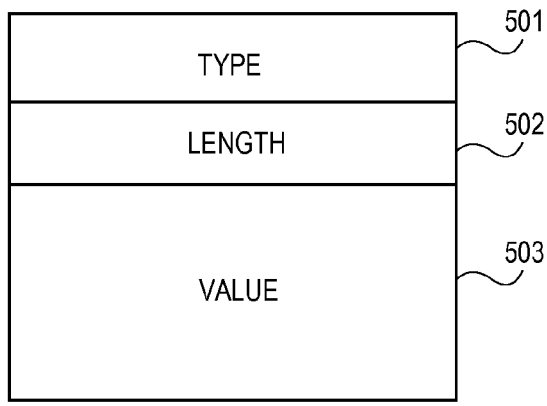
FIG. 5 is a diagram of the format of the Explicit Path (EP) descriptor for the protocol to provide the description of path and reservation data.

As it was mentioned above, for the explicit paths and trees, the reservation data has to be described somehow in order to make its distribution thorough the network possible. As this data is aimed to be distributed by PDUs of a control protocol, it has to be in the form suitable for these protocols. The descriptors of explicit paths are referred to as Explicit Path (EP) TLV herein. FIG. 5 is a diagram of the format of the EP TLV for the protocol to provide the description of path and reservation data. The descriptor is comprised of Type 501, Length 502 and Value 503 TLV. There are so many possibilities for the description of the required data, thus a couple of alternatives are only given here on a high level. The Type 501 field may indicate whether it is an explicit path, does it contain reservation too, or is it only for reservation. Note, that explicit paths and explicit trees may have different type fields. The Length 502 field indicates the size of the descriptor data. The Value 503 field is in fact the descriptor data, which may contain subfields or subTLVs. For example, the value can be an explicit path that may be a list of node identifiers, e.g. addresses, which list may be sorted.

For the operation of the protocol, it might be crucial how the databases are applied for the control protocols and how they are arranged. In some embodiments, maintenance of a new type of database, i.e. a database for the explicit paths, is utilized, which is referred to as Explicit Path Database (EPDB) or Explicit Tree Database (ETDB). As mentioned above, the most common protocol applied today for the control of forwarding paths within a network domain is link state routing, i.e. IS-IS or OSPF.

Figure 8:
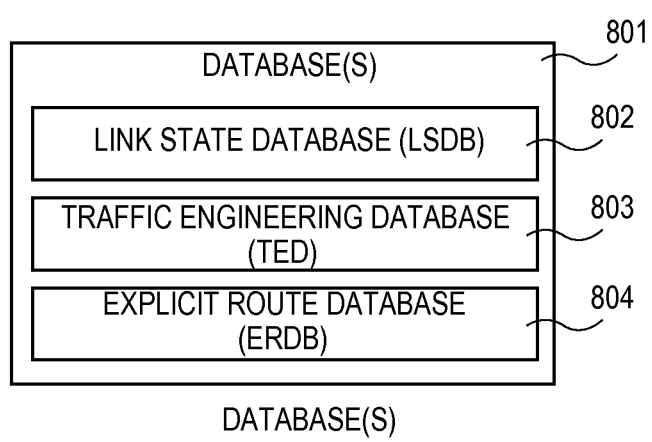
FIG. 8 is a diagram of databases that can be maintained in conjunction with the protocol.

FIG. 8 is a diagram of databases that can be maintained in conjunction with the protocol. FIG. 8 illustrate having a set of data bases 801 related to link state routing databases that are maintained by network nodes, these databases are maintained by an external PCE, as well. That is, the link state protocol maintains the LSDB 802. If traffic engineering extensions are implemented, then the link state protocol also maintains the TED 803. Note that LSDB and TED might be a common data base, i.e. a TED may be just an extended LSDB. Along the method proposed above, the EPDB is also maintained by the control protocol applied for PCR.

In some embodiments, the EPDB is separated from LSDB and TED, however, integrated implementation is also possible. Having a separate EPDB allows that the explicit paths are only stored by the network nodes taking part in the path. Thus, the size of the databases of nodes not participating in the explicit path is not increased unnecessarily, hence processing of the database is not slowed down by unnecessary data. Only the explicit paths are stored in a separate EPDB.

All reservation data is stored in the TED. That is, reservation data for explicit paths, shortest paths and CS paths are integrated, thus the data always shows values relevant for network resources, which is essential for further reservations or constrained routing.

If for example IS-IS is used in the network for shortest path and constrained routing, then the TLV for explicit paths is carried in Link State PDUs (LSP). PCE(s) receive the same LSPs that network nodes, thus PCEs are able to maintain a replica of the LSDB identical to network nodes, which is used as input for path computation by the PCR. After path computation, as described above, the PCE assembles (step 908) the EP TLV. In case of external PCE, the EP TLV is sent to the network node the PCE is connected to. The network node then floods an LSP carrying the EP TLV (step 909), thus the EP TLV gets to each node of the network. Network nodes along the path (e.g. 306, 406) store (step 910) the EP TLV in their EPDB (804). Finally, network nodes along the path (e.g. 306, 406) implement the EP TLV into their forwarding plane (step 911). If constrained routing is applied, then the new path(s) is/are also requested by flooding an EP TLV (step 905), which gets to each network node and stored in their EPDB (804). If reservation has to be performed too for the explicit path, then the simplest may be to carry reservation parameters in the same EP TLV as the explicit path, e.g. a bandwidth value to be reserved on each link. Then, the network nodes along the path (e.g. 306, 406) update (step 1009) their TED (803) according to the reservation parameter, e.g. decrease the available bandwidth on the links involved in the explicit path. The network nodes along the path (e.g. 306, 406) also install (step 1010) the reservation into their dataplane.

Figure 11:
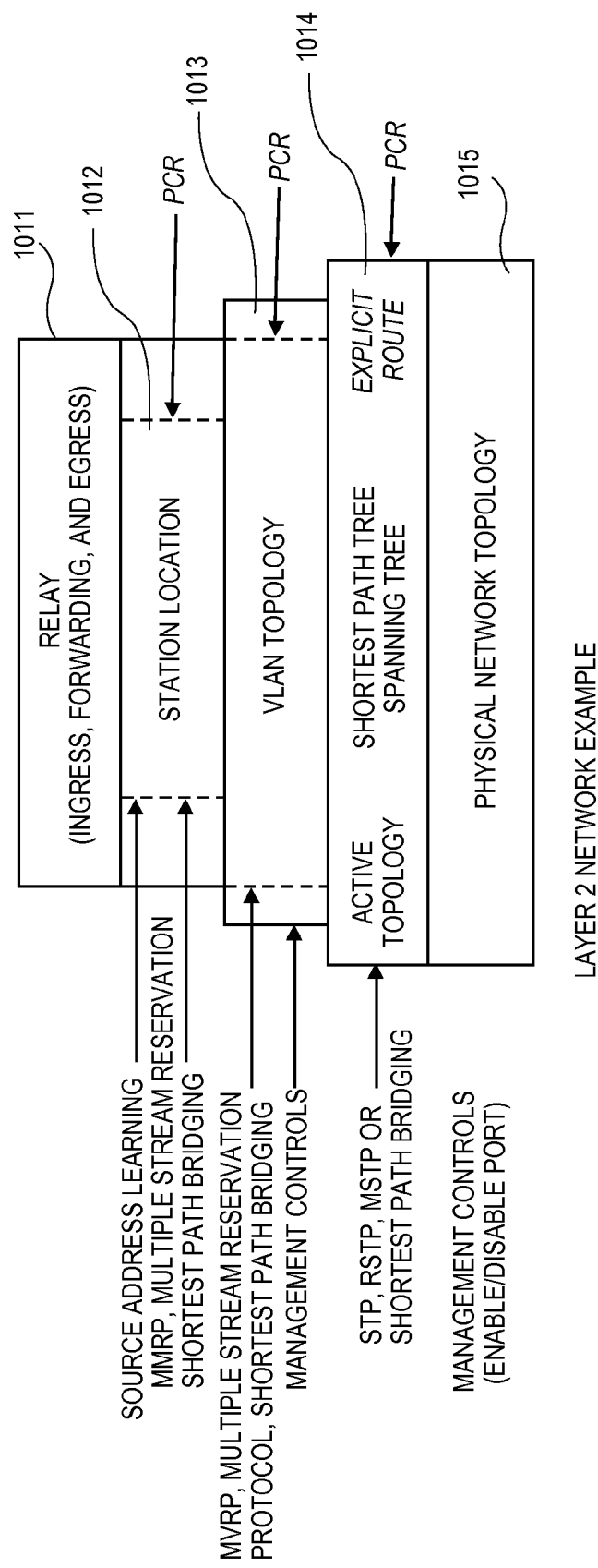
FIG. 11 is a diagram of one example embodiment of the topology structures applied in Ethernet networks together with the standard protocols that can control them.

The architecture and Path Control and Reservation protocol described in this application is for example applicable in Layer 2 (L2) Ethernet networks. FIG. 11 is a diagram of one example embodiment of the topology structures applied in Ethernet networks together with the standard protocols that can control them. Shortest Path Bridging (SPB) is an extension to IS-IS, i.e. applies the IS-IS operation of which principles were described above. The Path Control and Reservation protocol can be applied with SPB, hence operates as described in the above paragraph, that is IS-IS is used for the distribution of both path control and reservation data.

SRP and MSRP are already used today on top of a spanning tree for stream reservation between Talkers and Listeners in Ethernet networks. Following the principles illustrated in FIG. 11, the control of the Active Topology, i.e. of the forwarding paths, can be replace from spanning tree to shortest path trees or to explicit paths. MSRP then can run on top as today. That is, in case of applying SRP or MSRP, it may be that only the path control method depicted in FIG. 9 is used, the reservation method of FIG. 10 is not. Note however, that the databases have to be handled as described above for proper operation in that case too. That is the reservation data carried in MSRPDUs has to be stored in the TED too. Having MSRP running in a L2 network, one may prefer to apply MSRP as the control protocol carrier of EP TLVs in step 909. It is not entirely in-line with the layering of FIG. 11, but such an implementation is possible too. The EP TLV of FIG. 5 can be carried in MSRPDUs, i.e. today's MSRP can be enhanced to be involved in path control. In such an operation mode, the EPDB is maintained separately as described above based on the EP TLVs received in MRPDUs. That is, such an approach affects only step 909 of the proposed method by means of replacing IS-IS with MSRP as the control protocol for EP TLV distribution. All the other steps of the path control method of FIG. 9 are the same.

Reservation then is performed by MSRP operation. Note that despite MSRP has its own reservation process, the integration of the reservation method depicted in FIG. 11 may be valuable, e.g. for conflict resolution, due to having IS-IS controlled paths in the network instead of the former spanning trees. Note further that interworking between MSRP and IS-IS controlled network domain is possible too. That is, the PCE(s) may receive MSRPDUs aside the LSPs. For example MSRPDUs are also forwarded to the external PCE (311) in FIG. 3 or the hosts (e.g. 107 and 108) are connected to nodes (e.g. 407 and 403) implementing a PCE application. If each edge node of a network implements the PCE application, then the PCE is able to incorporate reservation data into the EP TLVs, which are then propagated and processed by IS-IS. Thus, MSRPDU exchange can be kept outside of the network domain, i.e. it is kept between hosts and edge nodes (between 107 and 402; between 108 and 403) and the domain is only controlled by IS-IS, e.g. by SPB.

Limitations of the Basic Path Control and Reservation Protocol

The Path Control and Reservation protocol described herein above is limited in a number of facets. Explicit paths once defined are not updated. A PCE computes the desired paths and IS-IS is utilized to install them. However, once installed they are not further modified or altered. The Path Control and Reservation protocol can be used to define explicit paths that are point to point. However, in some scenarios it may be desirable to support the use of maximal redundant trees (MRT) or similar structures. The embodiments provide an enhancement to the Path Control and Reservation protocol to support cautious updates and automation for the protocol as well as expand its capacity to specify different algorithms for path computation that can be associated with particular virtual local area networks (VLANs) and similar structures in the packet network. 'Automatic' or 'automatically' as used herein refers to a process or function that is triggered and executed without administrator intervention.

Definition and Identification of Dynamic Explicit Path Control Algorithm

In one embodiment, the Path Control and Reservation Protocol is enhanced to enable definition and identification of various methods for explicit path control including the methods based on cautious restoration. Thus each explicit path control method has its unique ID. The traffic under the control of a specific explicit path method is then associated with the ID of the method. In a Layer 2 bridge network, a way of providing this association is associating a VLAN ID or an I-SID with the ID of the given explicit path control method.

If one wants to implement the identification of the various explicit path control methods, then one possibility is to introduce new equal cost tree (ECT) algorithm values for the explicit path control methods, one for each. The exact method to be used for a particular VLAN is then determined by the ECT algorithm value to which the Base VID of the VLAN is assigned in the SPB Base VLAN identifiers sub-TLV. An example table of ECT Algorithms that can be assigned to a VLAN is set forth below in Table I. However, one skilled in the art would understand that any number or arrangement of possible ECT Algorithms could be defined for use with VLANs.

TABLE I

| ECT ALGORITHM | Algorithm Name | Behavior |
|---|---|---|
| 00-80-C2-20 | Static Explicit SE ECT-Algorithm | Static Explicit Path (EP) or Explicit Tree, which is installed by IS-IS-SPB only once. No restoration or update is performed automatically |
| 00-80-C2-21 | Disjoint Paths DP ECT-Algorithm | Two maximally Disjoint Paths (DP), which may be cautiously restored by IS-IS-SPB. If the network has become stable, then ISIS-SPB can restore the DPs one by one, one at a time |
| 00-80-C2-22 | Redundant Trees RT ECT-Algorithm | Two maximally redundant trees (MRT), which can be cautiously restored by IS-IS-SPB. If network has become stable, then IS-IS-SPB can restore MRTs one by one, one at a time |

The ECT Algorithm as described here also defines the restoration method to be applied. No restoration is applied in conjunction with the algorithm identified in the first entry of the table, i.e. for the static algorithm that provides strict explicit trees. In contrast, careful restoration is applied in conjunction with the other two methods, i.e. for disjoint paths and for redundant trees.

Redundancy

Loop Free Alternative Paths

The Path Control and Reservation protocol can be extended to support various types of protection or restoration schemes, also referred to as redundancy schemes. These redundancy schemes define backup paths for use where the base SPF paths fail or as alternates for explicitly defined paths.

In one embodiment, loop free alternatives (LFA) can be defined as a redundancy scheme, which can be provided by IS-IS for unicast flows. For example, LFA can be managed by IS-IS SPB for unicast flows of an SPBM VLAN or for SPBV VLANs. The LFAs are a downstream redundancy scheme, where an individual destination MAC address is downstream if it is ensured that the distance to the destination decreases at each hop along the path. Downstream paths are always loop free alternatives to each other with respect to an individual MAC address. Thus, a downstream alternate path can be safely used for local protection as a loop fee backup path.

Maximally Disjoint Paths and Redundant Trees

Point-to-point protection schemes often require maximally disjoint paths while multipoint protection schemes are typically based on maximally redundant trees. The Path Control and Reservation protocol can be extended to support installation of these paths and trees as well as to support the cautious recovery of these paths and trees after protection switches or similar events as described by the methods of the embodiments of the invention.

Static Paths and Trees

PCEs can calculate disjoint paths or maximally redundant trees using any specified algorithm. If two maximally disjoint paths are computed by a single PCE, then the two paths defined in two separate EP TLVs. In a case where the process is automated, the EP TLV including an EP sub-TLV that specifies the two endpoints of the path, with the remainder of the path to be calculated by the distributed PCEs. Each static maximally disjoint path can thus be installed independent of the other maximally disjoint path. Where a single PCE is involved in the computation of the maximally disjoint paths, both paths can be fully specified in their respective EP TLV (i.e., they are complete paths without any unresolved 'loose' hops). In one embodiment where disjoint paths are automated, a VID associated with each one of the disjoint paths can be allocated to a DP ECT-Algorithm, while in the case of static disjoint paths the VIDs are associated with the SE ECT-Algorithm.

Similarly, if two maximally redundant trees are computed by a single PCE, then two fully specified trees can be computed and described in respective EP TLVs. In some embodiments, the same TLV can be used for the specification of paths and trees, i.e. the EP sub-TLV may be used for trees as well. Each maximally redundant static tree can thus be installed independent of the other maximally redundant tree. Where a single PCE is involved in the computation of the maximally redundant trees, both trees can be fully specified. In one embodiment, distinct VIDs are associated with each of the trees (i.e., a primary VID and a backup VID) can be allocated to EP ECT-Algorithm where the trees are static, while the VID of each EP TLV can be associated with the RT ECT-Algorithm where the trees are automated.

The PCE calculating these EP TLVs including any sub-TLVs hands them to IS-IS which floods them through the network domain. Both of the redundant paths or trees are independently installed such that IS-IS is not aware of and does not have to manage any relationship between the paths or trees.

In one embodiment, the paths or trees associated with the SE ECT-Algorithm are static in the sense that no other entity can update them but the given single PCE. In the case of a topology change, it is the task of the single PCE to update these static redundant paths or trees if needed. The single PCE computes the new path or tree and assembles the new EP TLV to be passed to IS-IS for installation. The paths or trees that belong to the EP ECT-Algorithm can be aged out due to the regular IS-IS LSP aging unless refreshed by the PCE.

Path Restoration

Constrained routing can also be utilized for determining and maintaining maximally disjoint paths. Multiple PCEs can be involved in the calculation of the maximally disjoint paths where constrained routing is utilized. In one embodiment, each bridge in a network domain can have a separate PCE for constrained based pruning with CSPF. The DP ECT-Algorithm however is capable of determining two maximally disjoint paths that take into account additional constraints beyond being maximally disjoint. Further, DP ECT-Algorithm supports cautious path restoration after a topology change if it is needed as described herein below.

In the case where maximally disjoint paths are to be defined that have automated restoration, then the Base VID of each maximally disjoint path is allocated to the DP ECT-Algorithm. In one example, the Base VID can be allocated in a SPB Base VID sub-TLV. The Base VID can be the VID used for the primary path. The backup VID is associated to the Base VID and the DP ECT-Algorithm. For example, this can be done in one or more VID tuples of the SPB instance sub-TLV. In this example, the backup VID is in the SPVID field of the VLAN ID tuple, however, the backup ID is not an SPVID. If multiple VID tuples are used, then a distinct VID tuple is used for the association of the primary VID and the backup VID with the Based VID, in which case the primary VID may differ from the Base VID. The Primary VID may be also referred to as the Blue VID, while the backup VID may be referred to as the Red VID. Both the primary VID and the backup VID are allocated to the same MSTID, which can be for example SPBM, SPBV, or TE MSTID.

The installation of the two maximally disjoint paths is initiated by the flooding of an EP TLV (per step 905), which for example can include an EP sub-TLV. The Base VID of the VLAN tag field can include the value indicating the DP ECT-Algorithm. The backup VID may not be carried in the EP sub-TLV. The association of the Base VID is clear from the SPB instance sub-TLV as described above. Two maximally disjoint paths are determined for the loose (undefined) hops of the EP as strict hops do not have flexibility. The explicit path can be combined with constraints to affect the maximally disjoint paths.

Figure 12:
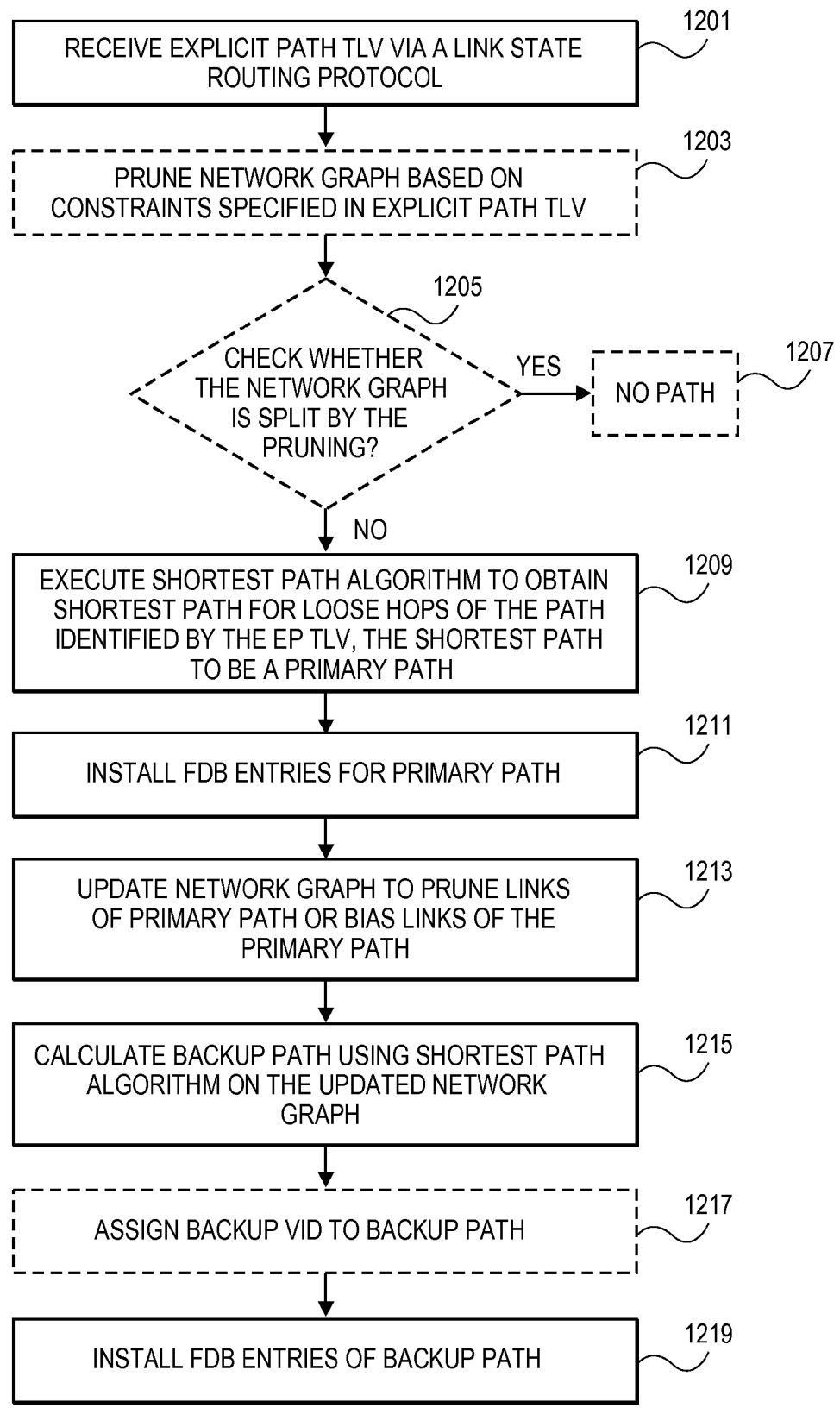
FIG. 12 is a flowchart for one embodiment of path computation using the DP ECT Algorithm.

In the LCE receiving the request for the explicit path with the EP-sub-TLV, a loose hop (i.e., unresolved link(s) in a path) can be computed as shown in FIG. 12. FIG. 12 is a flowchart for one embodiment of path computation using the DP ECT Algorithm. The process is triggered initially in response to receiving an EP TLV via a link state routing protocol such as IS-IS, the EP TLV specifying at least a partial path, step 1201, where the partial path may only be the end points of the path. The IS-IS message can include constraints that affect any loose hops in the path defined in the EP sub-TLV. The network graph (i.e. representing the topology of the packet network) maintained by the receiving node is then pruned according to these constraints to remove links that do not meet the constraints, step 1203. In some instances this can cause a split in the network graph. A check can be made whether a split has occurred in the network graph and where there is a split, the split can be checked to determine whether any path remains between the node and the destination node specified by the EP TLV step 1205. Where the constraints split the graph, then no path may exist and the process end, step 1207.

Where the network graph is not split (or the split did not preclude a route between the nodes), then a shortest path first (e.g., Dijkstra's) algorithm is executed to determine the shortest path and the loose hops of the specified path are determined to complete the path, which becomes the primary maximally disjoint path, step 1209. The associated forwarding entries are then updated in the forwarding database to install this primary path, step 1211. The routing system implemented in the network can require that all nodes generate the same result when computing a loose hop to achieve genuine maximal path diversity. In some embodiments, such as an IP routing system, the network would not have this property and there would be a possibility of common components between the primary and backup paths in a loose hop.

The calculation of the backup path then proceeds by removing the primary path links from the network graph or biasing the links step 1213. The removal of the links can be used where the removal doesn't split the network graph. Any adjustment to the link metrics can also be used to bias the path finding algorithm away from selecting the links of the primary path. The backup path is then calculated using the shortest path first (Dijkstra's) algorithm to find the backup path step 1215, which is then assigned the backup VID step 1217. Generally, the primary path and backup path have distinct VIDs, however, in some embodiments it is possible to utilize the same VID for the primary path and backup path. The forwarding information for this backup path is then added to the forwarding information base of the node step 1219. The backup path is selected to minimize common points of failure between the primary paths and the backup path thereby reducing the likelihood that any failure would render both the backup path and the primary path unable to forward data traffic to the target node. Pruning the network graph during this process ensures that no links used in the working path appear in the backup path, because the pruned links are not part of the network graph when the backup is computed. In some scenarios, pruning may result in an inability to produce a maximally diverse path. In other embodiments, biasing is utilized to select the backup path by biasing the selection against using links of the primary path but not prohibit their possible user. In the case where there is only one available link to reach a given destination, the link will be selected for both the primary path and the backup path with the remainder of the links being diverse. In contrast, if pruning is utilized then a backup path may not be found under these conditions.

Figure 13:
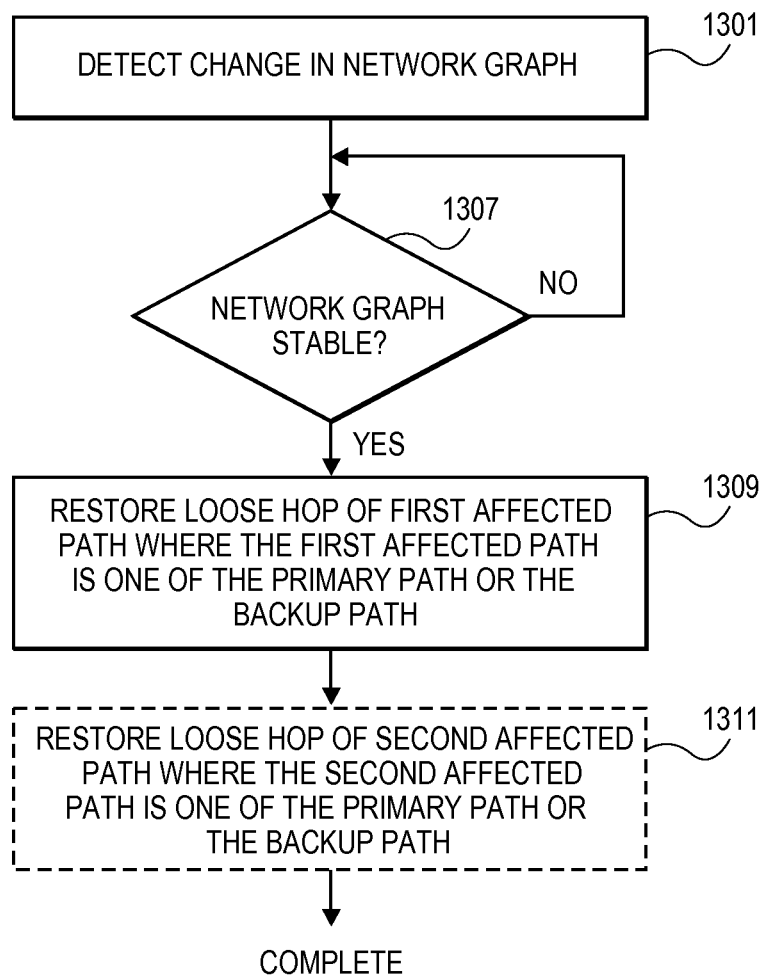
FIG. 13 is a flowchart of one embodiment of the cautious restoration process.

FIG. 13 is a flowchart of one embodiment of the cautious restoration process. The restoration process can be triggered in reaction to changes in the topology that may have caused a protection switch or otherwise affected the maximally disjoint paths step 1301. A check can be made whether the network has become stable for example determining that sufficient time has passed for the network graph to converge step 1307. Loose hop paths are updated cautiously if they are affected by this topology change. Neither of the disjoint paths is updated immediately. Once the network is stable, then one of the affected paths can be updated at a time (i.e., one of the primary or backup paths).

The paths can be updated in any order and dependent on which is affected. A first affected path can be chosen to be updated, i.e. restored step 1309. Then if both are affected a second affected path can be chosen to be updated, i.e., restored step 1311. If only the backup path went down, then steps 1213-1219 can be repeated again to update the backup path. The applied protection scheme can then use the backup path again if it needs to, for example in the case of 1+1 protection.

If only the primary path went down, then at this time only the backup path is in use by the applied protection scheme. The primary path is then updated according to steps 1203-1211. No further steps are taken until the primary path is back up again. The protection scheme can then revert to the primary path and the backup path can be updated according to steps 1213-1217.

In the case where both paths went down, then all of the steps 1203-1217 can be re-executed to update the primary, then the backup path and thereby re-enable the protection scheme.

Tree Restoration

The above-examples for FIGS. 12 and 13 have been given with reference to maximally disjoint paths. However, one skilled in the art would understand that this process can also be applied to maximally redundant trees. Maximally redundant trees can also be computed in a distributed fashion by multiple PCEs. Two maximally redundant trees can also be computed for multipoint protection, e.g. as specified by the MRT Lowpoint algorithm see http://tools.ietf.org/html/draft-enyedi-rtgwg-mrt-frr-algorithm-02, which is incorporated herein by reference.

In one example embodiment, if two maximally redundant trees are generated to be used such that they are cautiously restored after a topology change, the Base VID is allocated to the RT ECT-Algorithm. The Base VID is the primary VID used for the primary tree. The backup VID is associated to the Base VID and to the RT ECT-Algorithm.

Similar to the restoration of disjoint paths set forth above, the redundant trees are restored after the network graph is stabilized and only one of the trees is restored at a time. If only the backup tree is broken, then only the backup tree has to be restored and the data traffic can use the primary tree without interruption. If only the primary tree is broken, then all data traffic is switched to the backup tree until the primary tree is restored. If both the primary and the backup trees are affected, then the backup tree is only restored after the primary tree has been restored.

Extensions of the Restoration Process

In some embodiments, the restoration process for paths and trees described in relation to FIGS. 12 and 13 can be combined with any protection scheme or similar process. One skilled in the art would understand that the principles and structures described in relation to the Path and Tree restoration process could be adapted to other protection schemes and would vary accordingly. This can include the introduction of other ECT-Algorithms that can be identified in the SPB Base VLAN-Identifiers sub-TLV for a VID and would be added to the above-described table (i.e., Table I) as additional ECT-Algorithm options.

In one embodiment, an option for extending the restoration process is the specifying of whether the process is revertive vs non-revertive. A revertive process has been described herein above where traffic reverts back to a restored path, however some may prefer a non-revertive process, where traffic is not moved due to restoration. For example, if there was a protection event for a failure, then traffic stays on the protection path/tree instead of returning to the primary path when it is restored.

In some embodiments, it is possible to combine "Path Restoration" and "Tree Restoration" processes described above with the loop free alternate (LFA) process, which would introduce further options further ECT-Algorithms that may be supported for determining LFAs. In some embodiments, it is possible to combine "Path Restoration" and "Tree Restoration" processes based on primary and backup trees described above with the shortest paths.

Figure 14A:
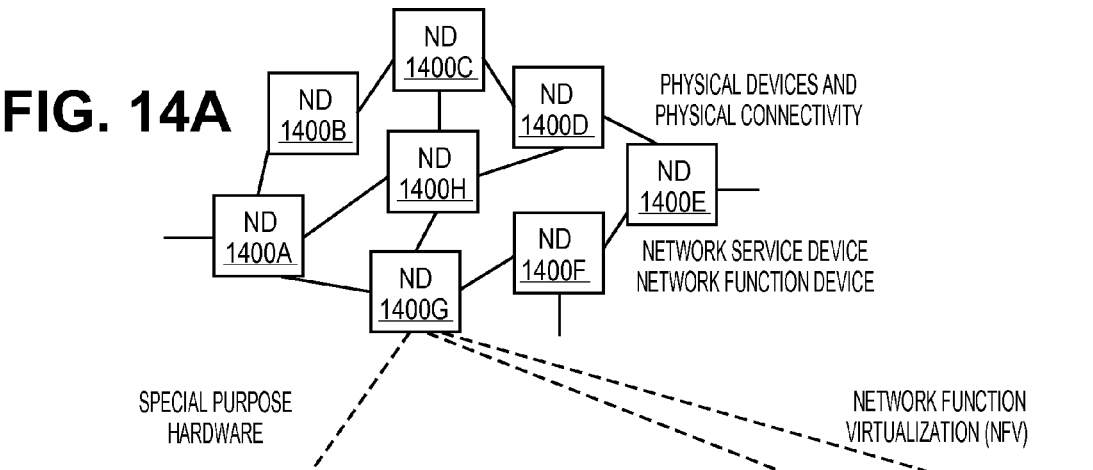
FIG. 14A illustrates connectivity between network devices (NDs) within an exemplary network, as well as three exemplary implementations of the NDs, according to some embodiments of the invention.

FIG. 14A illustrates connectivity between network devices (NDs) within an exemplary network, as well as three exemplary implementations of the NDs, according to some embodiments of the invention. FIG. 14A shows NDs 1400A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 1400A, E, and F illustrates that these NDs act as ingress and egress points for the network (and thus, these NDs are sometimes referred to as edge NDs; while the other NDs may be called core NDs).

Two of the exemplary ND implementations in FIG. 14A are: 1) a special-purpose network device 1402 that uses custom application—specific integrated—circuits (ASICs) and a proprietary operating system (OS); and 2) a general purpose network device 1404 that uses common off-the-shelf (COTS) processors and a standard OS.

The special-purpose network device 1402 includes networking hardware 1410 comprising compute resource(s) 1412 (which typically include a set of one or more processors), forwarding resource(s) 1414 (which typically include one or more ASICs and/or network processors), and physical network interfaces (NIs) 1416 (sometimes called physical ports), as well as non-transitory machine readable storage media 1418 having stored therein networking software 1420. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 1400A-H. During operation, the networking software 1420 may be executed by the networking hardware 1410 to instantiate a set of one or more networking software instance(s) 1422. Each of the networking software instance(s) 1422, and that part of the networking hardware 1410 that executes that network software instance (be it hardware dedicated to that networking software instance and/or time slices of hardware temporally shared by that networking software instance with others of the networking software instance(s) 1422), form a separate virtual network element 1430A-R. Each of the virtual network element(s) (VNEs) 1430A-R includes a control communication and configuration module 1432A-R (sometimes referred to as a local control module or control communication module) and forwarding table(s) 1434A-R, such that a given virtual network element (e.g., 1430A) includes the control communication and configuration module (e.g., 1432A), a set of one or more forwarding table(s) (e.g., 1434A), and that portion of the networking hardware 1410 that executes the virtual network element (e.g., 1430A). The PCE module 1433A implements the processes described herein above including primary and backup path computation restoration whereas LCE 1433B implements the functions described with regard to FIGS. 12 and 13 as part of the Control communication and Configuration Module 1432A or similar aspect of the networking software, which may be loaded and stored in the non-transitory machine readable media 1418 or in a similar location.

The special-purpose network device 1402 is often physically and/or logically considered to include: 1) a ND control plane 1424 (sometimes referred to as a control plane) comprising the compute resource(s) 1412 that execute the control communication and configuration module(s) 1432A-R; and 2) a ND forwarding plane 1426 (sometimes referred to as a forwarding plane, a data plane, or a media plane) comprising the forwarding resource(s) 1414 that utilize the forwarding table(s) 1434A-R and the physical NIs 1416. By way of example, where the ND is a router (or is implementing routing functionality), the ND control plane 1424 (the compute resource(s) 1412 executing the control communication and configuration module(s) 1432A-R) is typically responsible for participating in controlling how data (e.g., packets) is to be routed (e.g., the next hop for the data and the outgoing physical NI for that data) and storing that routing information in the forwarding table(s) 1434A-R, and the ND forwarding plane 1426 is responsible for receiving that data on the physical NIs 1416 and forwarding that data out the appropriate ones of the physical NIs 1416 based on the forwarding table(s) 1434A-R.

Figure 14B:
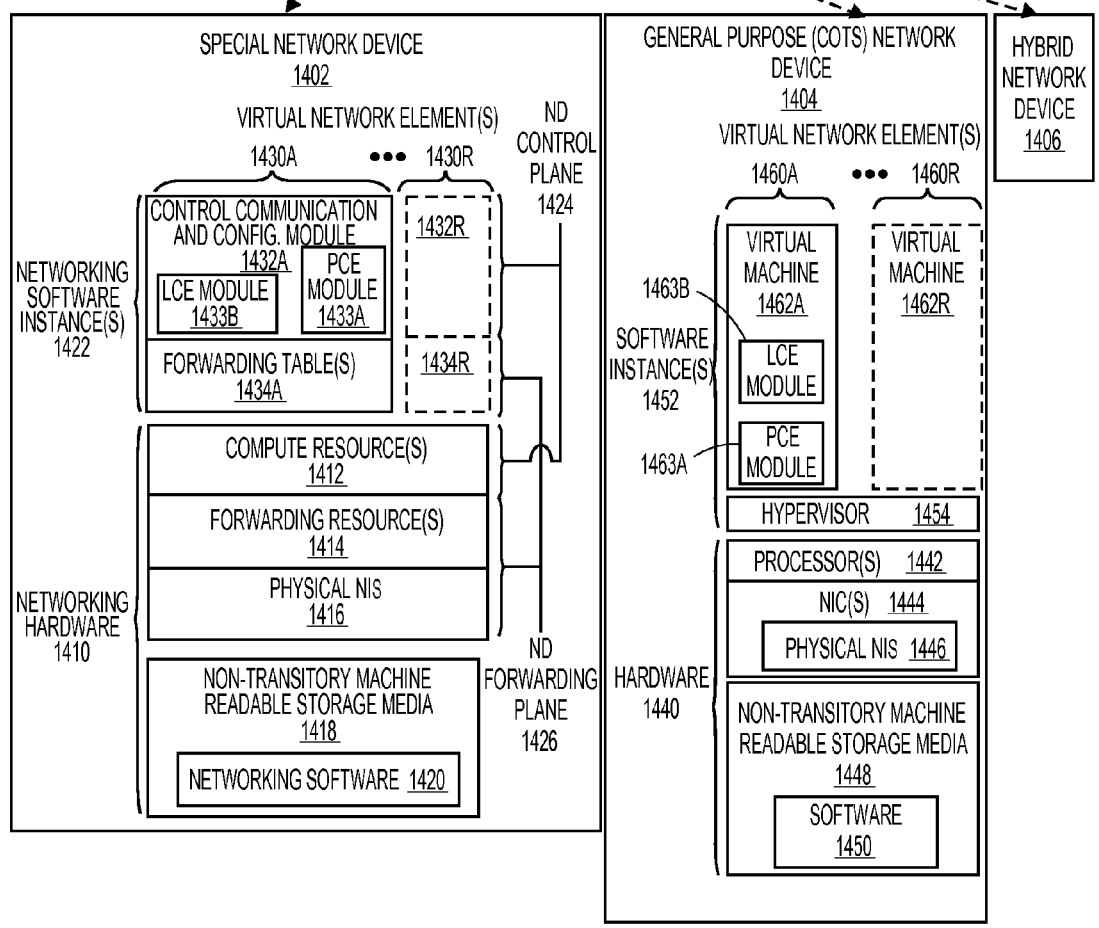
FIG. 14B illustrates an exemplary way to implement the special-purpose network device 1402 according to some embodiments of the invention.
Figure 14B:
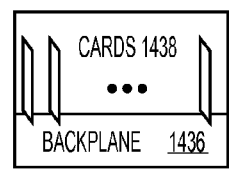

FIG. 14B illustrates an exemplary way to implement the special-purpose network device 1402 according to some embodiments of the invention. FIG. 14B shows a special-purpose network device including cards 1438 (typically hot pluggable). While in some embodiments the cards 1438 are of two types (one or more that operate as the ND forwarding plane 1426 (sometimes called line cards), and one or more that operate to implement the ND control plane 1424 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 1436 (e.g., a first full mesh coupling the line cards and a second full mesh coupling all of the cards).

Returning to FIG. 14A, the general purpose network device 1404 includes hardware 1440 comprising a set of one or more processor(s) 1442 (which are often COTS processors) and network interface controller(s) 1444 (NICs; also known as network interface cards) (which include physical NIs 1446), as well as non-transitory machine readable storage media 1448 having stored therein software 1450. During operation, the processor(s) 1442 execute the software 1450 to instantiate a hypervisor 1454 (sometimes referred to as a virtual machine monitor (VMM)) and one or more virtual machines 1462A-R that are run by the hypervisor 1454, which are collectively referred to as software instance(s) 1452. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 1462A-R, and that part of the hardware 1440 that executes that virtual machine (be it hardware dedicated to that virtual machine and/or time slices of hardware temporally shared by that virtual machine with others of the virtual machine(s) 1462A-R), forms a separate virtual network element(s) 1460A-R. In one embodiment, the virtual machines 1432A-R may execute the described PCE module 1463A, LCE module 1463B and related software described herein above.

The virtual network element(s) 1460A-R perform similar functionality to the virtual network element(s) 1430A-R. For instance, the hypervisor 1454 may present a virtual operating platform that appears like networking hardware 1410 to virtual machine 1462A, and the virtual machine 1462A may be used to implement functionality similar to the control communication and configuration module(s) 1432A and forwarding table(s) 1434A (this virtualization of the hardware 1440 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the virtual machine(s) 1462A-R differently. For example, while embodiments of the invention are illustrated with each virtual machine 1462A-R corresponding to one VNE 1460A-R, alternative embodiments may implement this correspondence at a finer level granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In certain embodiments, the hypervisor 1454 includes a virtual switch that provides similar forwarding services as a physical Ethernet switch. Specifically, this virtual switch forwards traffic between virtual machines and the NIC(s) 1444, as well as optionally between the virtual machines 1462A-R; in addition, this virtual switch may enforce network isolation between the VNEs 1460A-R that by policy are not permitted to communicate with each other (e.g., by honoring virtual local area networks (VLANs)).

The third exemplary ND implementation in FIG. 14A is a hybrid network device 1406, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 1402) could provide for para-virtualization to the networking hardware present in the hybrid network device 1406.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 1430A-R, VNEs 1460A-R, and those in the hybrid network device 1406) receives data on the physical NIs (e.g., 1416, 1446) and forwards that data out the appropriate ones of the physical NIs (e.g., 1416, 1446). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

FIG. 14C illustrates various exemplary ways in which VNEs may be coupled according to some embodiments of the invention. FIG. 14C shows VNEs 1470A.1-1470A.P (and optionally VNEs 1470A.Q-1470A.R) implemented in ND 1400A and VNE 1470H.1 in ND 500H. In FIG. 14C, VNEs 1470A.1-P are separate from each other in the sense that they can receive packets from outside ND 1400A and forward packets outside of ND 1400A; VNE 1470A.1 is coupled with VNE 1470H.1, and thus they communicate packets between their respective NDs; VNE 1470A.2-1470A.3 may optionally forward packets between themselves without forwarding them outside of the ND 1400A; and VNE 1470A.P may optionally be the first in a chain of VNEs that includes VNE 1470A.Q followed by VNE 1470A.R (this is sometimes referred to as dynamic service chaining, where each of the VNEs in the series of VNEs provides a different service—e.g., one or more layer 4-7 network services). While FIG. 14C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 14A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 14A may also host one or more such servers (e.g., in the case of the general purpose network device 1404, one or more of the virtual machines 1462A-R may operate as servers; the same would be true for the hybrid network device 1406; in the case of the special-purpose network device 1402, one or more such servers could also be run on a hypervisor executed by the compute resource(s) 1412); in which case the servers are said to be co-located with the VNEs of that ND.

A virtual network is a logical abstraction of a physical network (such as that in FIG. 14A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 14D illustrates a network with a single network element on each of the NDs of FIG. 14A, and within this straight forward approach contrasts a traditional distributed approach (commonly used by traditional routers) with a centralized approach for maintaining reachability and forwarding information (also called network control), according to some embodiments of the invention. Specifically, FIG. 14D illustrates network elements (NEs) 1470A-H with the same connectivity as the NDs 1400A-H of FIG. 14A.

FIG. 14D illustrates that the distributed approach 1472 distributes responsibility for generating the reachability and forwarding information across the NEs 1470A-H; in other words, the process of neighbor discovery and topology discovery is distributed.

For example, where the special-purpose network device 1402 is used, the control communication and configuration module(s) 1432A-R of the ND control plane 1424 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 570A-H (e.g., the compute resource(s) 1412 executing the control communication and configuration module(s) 1432A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 1424. The ND control plane 1424 programs the ND forwarding plane 1426 with information (e.g., adjacency and route information) based on the routing structure(s). For example, the ND control plane 1424 programs the adjacency and route information into one or more forwarding table(s) 1434A-R (e.g., Forwarding Information Base (FIB), Label Forwarding Information Base (LFIB), and one or more adjacency structures) on the ND forwarding plane 1426. For layer 2 forwarding, the ND can store one or more bridging tables that are used to forward data based on the layer 2 information in that data. While the above example uses the special-purpose network device 1402, the same distributed approach 1472 can be implemented on the general purpose network device 1404 and the hybrid network device 1406.

FIG. 14D illustrates that a centralized approach 1474 (which in some embodiments can be a software defined networking (SDN) solution) that decouples the system that makes decisions about where traffic is sent from the underlying systems that forwards traffic to the selected destination. The illustrated centralized approach 1474 has the responsibility for the generation of reachability and forwarding information in a centralized control plane 1476 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 1476 has a south bound interface 1482 with a data plane 1480 (sometime referred to the infrastructure layer, network forwarding plane, or forwarding plane (which should not be confused with a ND forwarding plane)) that includes the NEs 1470A-H (sometimes referred to as switches, forwarding elements, data plane elements, or nodes). The centralized control plane 1476 includes a network controller 1478, which includes a centralized reachability and forwarding information module 1479 that determines the reachability within the network and distributes the forwarding information to the NEs 570A-H of the data plane 1480 over the south bound interface 1482 (which may use the OpenFlow protocol). Thus, the network intelligence is centralized in the centralized control plane 1476 executing on electronic devices that are typically separate from the NDs. In one embodiment, the centralized reachability and forwarding information module 1479 may include the PCE module 1481 and related software as described herein above.

For example, where the special-purpose network device 1402 is used in the data plane 1480, each of the control communication and configuration module(s) 1432A-R of the ND control plane 1424 typically include a control agent that provides the VNE side of the south bound interface 1482. In this case, the ND control plane 1424 (the compute resource(s) 1412 executing the control communication and configuration module(s) 1432A-R) performs its responsibility for participating in controlling how data (e.g., packets) is to be routed (e.g., the next hop for the data and the outgoing physical NI for that data) through the control agent communicating with the centralized control plane 1476 to receive the forwarding information (and in some cases, the reachability information) from the centralized reachability and forwarding information module 1479 (it should be understood that in some embodiments of the invention, the control communication and configuration module(s) 1432A-R, in addition to communicating with the centralized control plane 1476, may also play some role in determining reachability and/or calculating forwarding information—albeit less so than in the case of a distributed approach; such embodiments are generally considered to fall under the centralized approach 1474, but may also be considered a hybrid approach).

While the above example uses the special-purpose network device 1402, the same centralized approach 1474 can be implemented with the general purpose network device 1404 (e.g., each of the VNE 1460A-R performs its responsibility for controlling how data (e.g., packets) is to be routed (e.g., the next hop for the data and the outgoing physical NI for that data) by communicating with the centralized control plane 1476 to receive the forwarding information (and in some cases, the reachability information) from the centralized reachability and forwarding information module 1479; it should be understood that in some embodiments of the invention, the VNEs 1460A-R, in addition to communicating with the centralized control plane 1476, may also play some role in determining reachability and/or calculating forwarding information—albeit less so than in the case of a distributed approach) and the hybrid network device 1406. In fact, the use of SDN techniques can enhance the NFV techniques typically used in the general purpose network device 1404 or hybrid network device 1406 implementations as NFV is able to support SDN by providing an infrastructure upon which the SDN software can be run, and NFV and SDN both aim to make use of commodity server hardware and physical switches.

FIG. 14D also shows that the centralized control plane 1476 has a north bound interface 1484 to an application layer 1486, in which resides application(s) 1488. The centralized control plane 1476 has the ability to form virtual networks 1492 (sometimes referred to as a logical forwarding plane, network services, or overlay networks (with the NEs 1470A-H of the data plane 1480 being the underlay network)) for the application(s) 1488. Thus, the centralized control plane 1476 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 14D shows the distributed approach 1472 separate from the centralized approach 1474, the effort of network control may be distributed differently or the two combined in certain embodiments of the invention. For example: 1) embodiments may generally use the centralized approach (SDN) 1474, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 1474, but may also be considered a hybrid approach.

In one example hybrid approach, there are both centralized and distributed intelligence in the network. This is a hybrid approach in the sense that the centralized principles of a SDN are implemented by the PCE module 1481 while the distributed protocol is maintained, namely IS-IS. Thus, there are intelligent components in both the PCE module 1481 at the controller and distributed throughout the network at the LCE modules in the nodes of the network devices. In other words, this process works with central intelligence of the PCE module 1481 at the SDN controller. In addition, there is distributed intelligence at the nodes, which have to run IS-IS and the Local Computation Engine. In this example embodiment, the network nodes (i.e. NDs) are not dumb, i.e. the implement the functions described herein above via the LCE.

While FIG. 14D illustrates the simple case where each of the NDs 1400A-H implements a single NE 1470A-H, it should be understood that the network control approaches described with reference to FIG. 14D also work for networks where one or more of the NDs 1400A-H implement multiple VNEs (e.g., VNEs 1430A-R, VNEs 1460A-R, those in the hybrid network device 1406). Alternatively or in addition, the network controller 1478 may also emulate the implementation of multiple VNEs in a single ND. Specifically, instead of (or in addition to) implementing multiple VNEs in a single ND, the network controller 1478 may present the implementation of a VNE/NE in a single ND as multiple VNEs in the virtual networks 1492 (all in the same one of the virtual network(s) 1492, each in different ones of the virtual network(s) 1492, or some combination). For example, the network controller 1478 may cause an ND to implement a single VNE (a NE) in the underlay network, and then logically divide up the resources of that NE within the centralized control plane 1476 to present different VNEs in the virtual network(s) 1492 (where these different VNEs in the overlay networks are sharing the resources of the single VNE/NE implementation on the ND in the underlay network).

On the other hand, FIGS. 14E and 14F respectively illustrate exemplary abstractions of NEs and VNEs that the network controller 1478 may present as part of different ones of the virtual networks 1492. FIG. 14E illustrates the simple case of where each of the NDs 1400A-H implements a single NE 1470A-H (see FIG. 14D), but the centralized control plane 1476 has abstracted multiple of the NEs in different NDs (the NEs 1470A-C and G-H) into (to represent) a single NE 1470I in one of the virtual network(s) 1492 of FIG. 14D, according to some embodiments of the invention. FIG. 14E shows that in this virtual network, the NE 1470I is coupled to NE 1470D and 1470F, which are both still coupled to NE 1470E.

FIG. 14F illustrates a case where multiple VNEs (VNE 1470A.1 and VNE 1470H.1) are implemented on different NDs (ND 1400A and ND 1400H) and are coupled to each other, and where the centralized control plane 1476 has abstracted these multiple VNEs such that they appear as a single VNE 1470T within one of the virtual networks 1492 of FIG. 14D, according to some embodiments of the invention. Thus, the abstraction of a NE or VNE can span multiple NDs.

While some embodiments of the invention implement the centralized control plane 1476 as a single entity (e.g., a single instance of software running on a single electronic device), alternative embodiments may spread the functionality across multiple entities for redundancy and/or scalability purposes (e.g., multiple instances of software running on different electronic devices).

Figure 15:
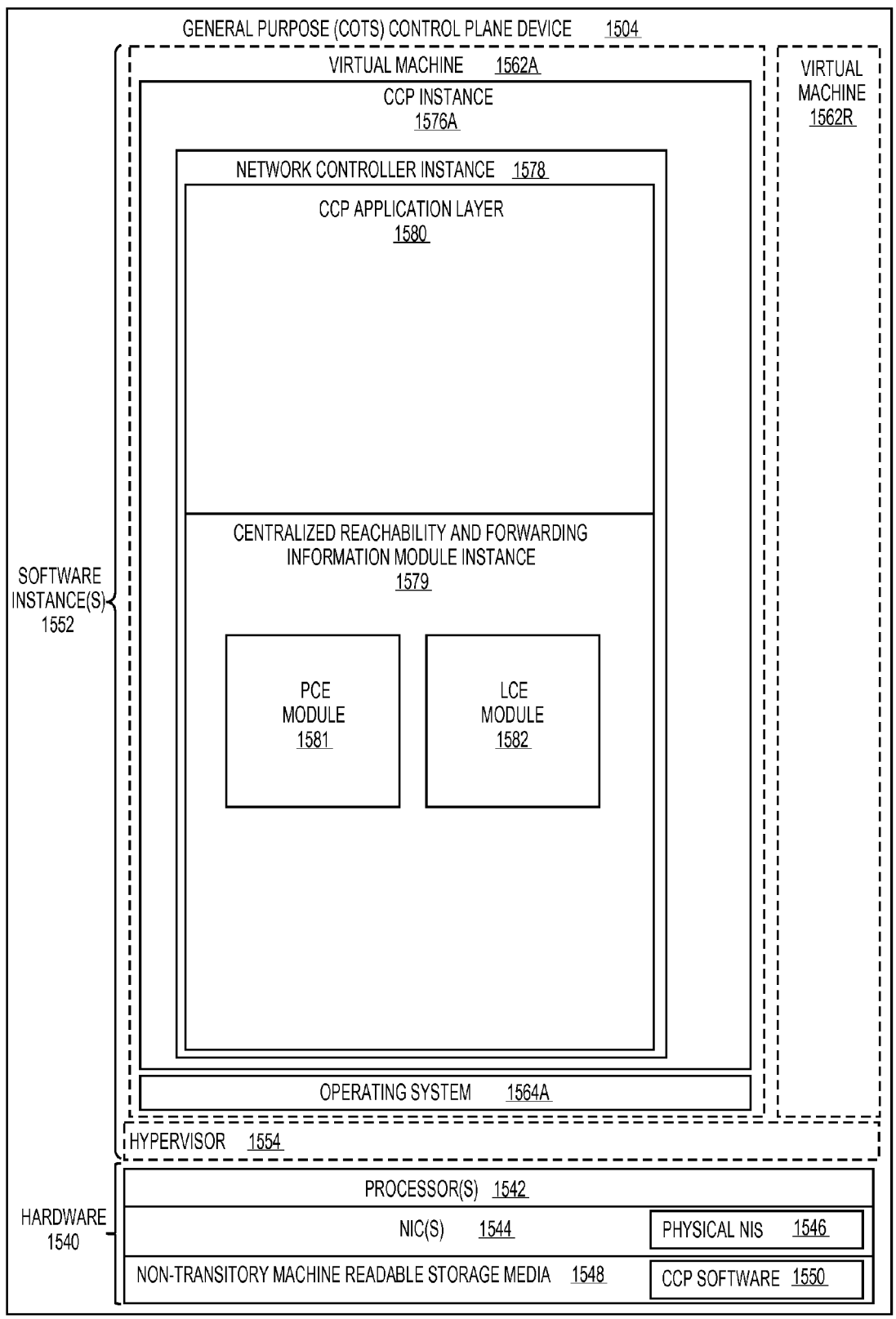
FIG. 15 illustrates a general purpose control plane device 1504 including hardware 1440 comprising a set of one or more processor(s) 1442 (which are often Commercial off-the-shelf (COTS) processors) and network interface controller(s) 1444 (NICs; also known as network interface cards) (which include physical NIs 1446), as well as non-transitory machine readable storage media 1448 having stored therein centralized control plane (CCP) software 1450), according to some embodiments of the invention.

Similar to the network device implementations, the electronic device(s) running the centralized control plane 1476, and thus the network controller 1478 including the centralized reachability and forwarding information module 1479, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 15 illustrates, a general purpose control plane device 1504 including hardware 1540 comprising a set of one or more processor(s) 1542 (which are often COTS processors) and network interface controller(s) 1544 (NICs; also known as network interface cards) (which include physical NIs 1546), as well as non-transitory machine readable storage media 1548 having stored therein centralized control plane (CCP) software 1550.

In embodiments that use compute virtualization, the processor(s) 1542 typically execute software to instantiate a hypervisor 1554 (sometimes referred to as a virtual machine monitor (VMM)) and one or more virtual machines 1562A-R that are run by the hypervisor 1554; which are collectively referred to as software instance(s) 1552. A virtual machine is a software implementation of a physical machine that runs programs as if they were executing on a physical, non-virtualized machine; and applications generally are not aware they are running on a virtual machine as opposed to running on a "bare metal" host electronic device, though some systems provide para-virtualization which allows an operating system or application to be aware of the presence of virtualization for optimization purposes. Again, in embodiments where compute virtualization is used, during operation an instance of the CCP software 1550 (illustrated as CCP instance 1576A) on top of an operating system 1564A are typically executed within the virtual machine 1562A. In embodiments where compute virtualization is not used, the CCP instance 1576A on top of operating system 1564A is executed on the "bare metal" general purpose control plane device 1504.

The operating system 1564A provides basic processing, input/output (I/O), and networking capabilities. In some embodiments, the CCP instance 1576A includes a network controller instance 1578. The network controller instance 1578 includes a centralized reachability and forwarding information module instance 1579 (which is a middleware layer providing the context of the network controller 1578 to the operating system 1564A and communicating with the various NEs), and an CCP application layer 1580 (sometimes referred to as an application layer) over the middleware layer (providing the intelligence required for various network operations such as protocols, network situational awareness, and user—interfaces). In one embodiment, the centralized reachability and forwarding information module 1579 may include the PCE module 1581, LCE module 1582 and related software as described herein above.

At a more abstract level, this CCP application layer 1580 within the centralized control plane 1576 works with virtual network view(s) (logical view(s) of the network) and the middleware layer provides the conversion from the virtual networks to the physical view.

The centralized control plane 1476 transmits relevant messages to the data plane 580 based on CCP application layer 1580 calculations and middleware layer mapping for each flow. A flow may be defined as a set of packets whose headers match a given pattern of bits; in this sense, traditional IP forwarding is also flow—based forwarding where the flows are defined by the destination IP address for example; however, in other implementations, the given pattern of bits used for a flow definition may include more fields (e.g., 10 or more) in the packet headers. Different NDs/NEs/VNEs of the data plane 1480 may receive different messages, and thus different forwarding information. The data plane 1480 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 1480, the packet (or a subset of the packet header and content) is typically forwarded to the centralized control plane 1476. The centralized control plane 1476 will then program forwarding table entries into the data plane 580 to accommodate packets belonging to the flow of the unknown packet. Once a specific forwarding table entry has been programmed into the data plane 1480 by the centralized control plane 1476, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) (RFC 2991 and 2992) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

Thus, a method, system and apparatus for restoration of explicit paths in a packet network have been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method implemented by a network device executing a local computation engine and a link state routing protocol, where the local computation engine and the link state protocol support automatic establishment of redundant paths and cautious restoration in a packet network, the method comprising the steps of:
   receiving an explicit path (EP) type length value (TLV) via a link state routing protocol, where the EP TLV identifies a set of network devices in an explicit path;
   executing a shortest path algorithm to obtain a shortest path for loose hops of a path identified by the EP TLV, the shortest path to be a primary path;
   installing forwarding database entries for the primary path;
   updating a network graph to prune links of the primary path or bias links of the primary path;
   calculating a backup path using the shortest path algorithm on the updated network graph; and
   installing forwarding database entries for the backup path.

2. The method of claim 1, further comprising the step of:
   pruning the network graph of the packet network based on constraints specified in the EP TLV.

3. The method of claim 2, further comprising the step of:
   checking whether the network graph of the packet network is split by the pruning of the network graph of the packet network.

4. The method of claim 1, wherein biasing links of the primary path includes adjusting metrics of the links of the primary path to bias the shortest path algorithm away from selecting the links of the primary path for the backup path.

5. The method of claim 1, further comprising:
   assigning a backup virtual local area network (VLAN) identifier (ID) to the backup path.

6. The method of claim 1, the method comprising the steps of:
   detecting a change in the network graph;
   checking whether the network graph is stable; and
   restoring one of the primary path or the backup path affected by the change to the network graph.

7. The method of claim 6, further comprising:
   restoring the other of the primary path or the backup path affected by the change in the network graph after completion of the restoring of the primary path or backup path.

8. A network device executing a local computation engine and a link state routing protocol, where the local computation engine and the link state protocol support automatic establishment of redundant paths and cautious restoration in a packet network, the computing device comprising:
   a non-transitory machine-readable storage medium to receive and store a set of explicit path (EP) type length value (TLV) received via a link state routing protocol, where the EP TLV identifies a set of network devices in an explicit path; and
   a processor coupled to the memory device, the processor configured to execute the local computation engine (LCE) module to process the EP TLV, to execute a shortest path algorithm to obtain a shortest path for loose hops of a path identified by the EP TLV, the shortest path to be a primary path, to install forwarding database entries for the primary path, to update a network graph to prune links of the primary path or bias links of the primary path, to calculate a backup path using the shortest path algorithm on the updated network graph, and to install forwarding database entries for the backup path.

9. The network device of claim 8, wherein the processor is further configured to execute the LCE module that is further configured to prune the network graph of the packet network based on constraints specified in the EP TLV.

10. The network device of claim 9, wherein the processor is further configured to execute the LCE module that is further configured to check whether the network graph of the packet network is split by the pruning of the network graph of the packet network.

11. The network device of claim 8, wherein biasing links of the primary path includes adjusting metrics of the links of the primary path to bias the shortest path algorithm away from selecting the links of the primary path for the backup path.

12. The network device of claim 8, wherein the processor is further configured to execute the LCE module that is further configured to assign a backup virtual local area network (VLAN) identifier (ID) to the backup path.

13. The network device of claim 8, wherein the processor is further configured to execute the LCE module that is further configured to detect a change in the network graph, to check whether the network graph is stable, and to restore one of the primary path or the backup path affected by the change to the network graph.

14. The network device of claim 8, wherein the processor is further configured to execute the LCE module that is further configured to restore the other of the primary path or the backup path affected by the change in the network graph after completion of the restoring of the primary path or backup path.

15. A control plane device to execute a path computation element and a link state routing protocol, where the path computation element and the link state protocol support automatic establishment of redundant paths and cautious restoration in a packet network, the control plane device comprising:
   a non-transitory machine-readable storage medium to receive and store a set of explicit path (EP) type length value (TLV) received via a link state routing protocol, where the EP TLV identifies a set of network devices in an explicit path; and a network processor coupled to the memory device, the network processor configured to execute the path computation element (PCE) module to generate the EP TLV to be sent to local computation engine (LCE) modules in the packet network to direct the LCE modules to execute a shortest path algorithm to obtain a shortest path for loose hops of a path identified by the EP TLV, the shortest path to be a primary path, to install forwarding database entries for the primary path, to update a network graph to prune links of the primary path or bias links of the primary path, to calculate a backup path using the shortest path algorithm on the updated network graph, and to install forwarding database entries for the backup path.

16. The control plane device of claim 15, wherein the PCE generated EP TLV causes the LCE module to prune a network graph of the packet network based on constraints specified in the EP TLV.

17. The control plane device of claim 16, wherein the PCE generated EP TLV causes the LCE module to check whether the network graph of the packet network is split by the pruning of the network graph of the packet network.

18. The control plane device of claim 15, wherein biasing links of the primary path includes adjusting metrics of the links of the primary path to bias the shortest path algorithm away from selecting the links of the primary path for the backup path.

19. The control plane device of claim 15, wherein the PCE generated EP TLV causes the LCE module to assign a backup virtual local area network (VLAN) identifier (ID) to the backup path.

20. The control plane device of claim 15, the PCE generated EP TLV causes the LCE module to detect a change in the network graph, to check whether the network graph is stable, and to restore one of the primary path or the backup path affected by the change to the network graph.

21. The control plane device of claim 15, the PCE generated EP TLV causes the LCE module to restore the other of the primary path or the backup path affected by the change in the network graph after completion of the restoring of the primary path or backup path.

22. A computing device implementing a plurality of virtual machines for implementing network function virtualization (NFV), wherein a virtual machine from the plurality of virtual machines is configured to execute a local computation engine and a link state routing protocol, where the local computation engine and the link state protocol support automatic establishment of redundant paths and cautious restoration in a packet network, the computing device comprising:
a non-transitory machine-readable storage medium to receive and store a set of explicit path (EP) type length value (TLV) received via a link state routing protocol, where the EP TLV identifies a set of network devices in an explicit path; and
a processor coupled to the memory device, the processor configured to execute the virtual machine that implements the local computation engine (LCE) module that processes the EP TLV, executes a shortest path algorithm to obtain a shortest path for loose hops of a path identified by the EP TLV, the shortest path to be a primary path, installs forwarding database entries for the primary path, to update a network graph to prune links of the primary path or bias links of the primary path, calculates a backup path using the shortest path algorithm on the updated network graph, and installs forwarding database entries for the backup path.

23. The computing device of claim 22, wherein the processor is further configured to execute the virtual machine that implements the LCE module that is further configured to prune the network graph of the packet network based on constraints specified in the EP TLV.

24. The computing device of claim 23, wherein the processor is further configured to execute the virtual machine that implements the LCE module that is further configured to check whether the network graph of the packet network is split by the pruning of the network graph of the packet network.

25. The computing device of claim 22, wherein biasing links of the primary path includes adjusting metrics of the links of the primary path to bias the shortest path algorithm away from selecting the links of the primary path for the backup path.

26. The computing device of claim 22, wherein the processor is further configured to execute the virtual machine that implements the LCE module that is further configured to assign a backup virtual local area network (VLAN) identifier (ID) to the backup path.

27. The computing device of claim 22, wherein the processor is further configured to execute the virtual machine that implements the LCE module that is further configured to detect a change in the network graph, to check whether the network graph is stable, and to restore one of the primary path or the backup path affected by the change to the network graph.

28. The computing device of claim 22, wherein the processor is further configured to execute the virtual machine that implements the LCE module that is further configured to restore the other of the primary path or the backup path affected by the change in the network graph after completion of the restoring of the primary path or backup path.

* * * * *